US011985958B1

(12) United States Patent
Moody et al.

(10) Patent No.: US 11,985,958 B1
(45) Date of Patent: May 21, 2024

(54) BIRD FEEDING SYSTEM

(71) Applicant: David Ronald Moody, Mount Calvary, WI (US)

(72) Inventors: David Ronald Moody, Mount Calvary, WI (US); David Alan Duley, Fond du Lac, WI (US)

(73) Assignee: David Moody, Fond du Lac, WI (US)

( * ) Notice: Subject to any disclaimer, the term of this patent is extended or adjusted under 35 U.S.C. 154(b) by 347 days.

(21) Appl. No.: 17/559,794

(22) Filed: Dec. 22, 2021

Related U.S. Application Data

(60) Provisional application No. 63/132,157, filed on Dec. 30, 2020.

(51) Int. Cl.
*A01K 39/01* (2006.01)

(52) U.S. Cl.
CPC .................... *A01K 39/01* (2013.01)

(58) Field of Classification Search
CPC ...... A01K 39/01; A01K 39/012; A01K 39/00; A01K 39/0106; A01K 39/0113
USPC ................................. 119/57.8, 57.9
See application file for complete search history.

(56) References Cited

U.S. PATENT DOCUMENTS

| 4,434,745 | A | 3/1984 | Perkins et al. |
| 5,016,573 | A | 5/1991 | Power |
| D351,691 | S | 10/1994 | Lipton |
| 6,758,164 | B2 | 7/2004 | Rich |
| 7,237,507 | B1* | 7/2007 | Colwell ............ A01K 39/0113 119/51.01 |
| 9,277,735 | B2* | 3/2016 | Murray ............... A01K 39/012 |
| 2006/0260553 | A1 | 11/2006 | Cote |
| 2007/0266950 | A1 | 11/2007 | Walsh |
| 2023/0404028 | A1* | 12/2023 | Carter ...................... A01K 7/02 |

OTHER PUBLICATIONS

Woodlink, Woodlink MAG1 Magnum Sunflower Screen Feeder, as viewed at https://www.amazon.com/Woodlink-MAG1-Magnum-Sunflower-Screen/dp/B000HAQPXE?ref_=fsclp_pl_dp_2 on Jul. 14, 2020. 9 pages.

Perky-Pet, Perky-Pet 114 Squirrel Stumper Wild Bird Feeder, as viewed at https://www.amazon.com/Perky-Pet-114-Squirrel-Stumper-Feeder/dp/B000TZ8T0E on Jul. 14, 2020. 11 pages.

* cited by examiner

*Primary Examiner* — Yvonne R Abbott-Lewis
(74) *Attorney, Agent, or Firm* — Brannen Law Office, LLC

(57) ABSTRACT

A bird feeding system is provided having a body and a removable insert. The insert can be removed and refilled without removing the body from its support. The body has a receiver that can be a cage, collar, roof or other structure that has a guide that receives the insert. A plate is attached to the top of the receiver. The plate has at least two hooks, each with a channel. The hooks are opposite facing. The insert has a cylindrical wall with feed opening therethrough. A top bar is used as a handle and also as a securing element that is selectably engaged with the hooks. A bottom bar is used to grip the insert for insertion, locking, unlocking and removal.

20 Claims, 29 Drawing Sheets

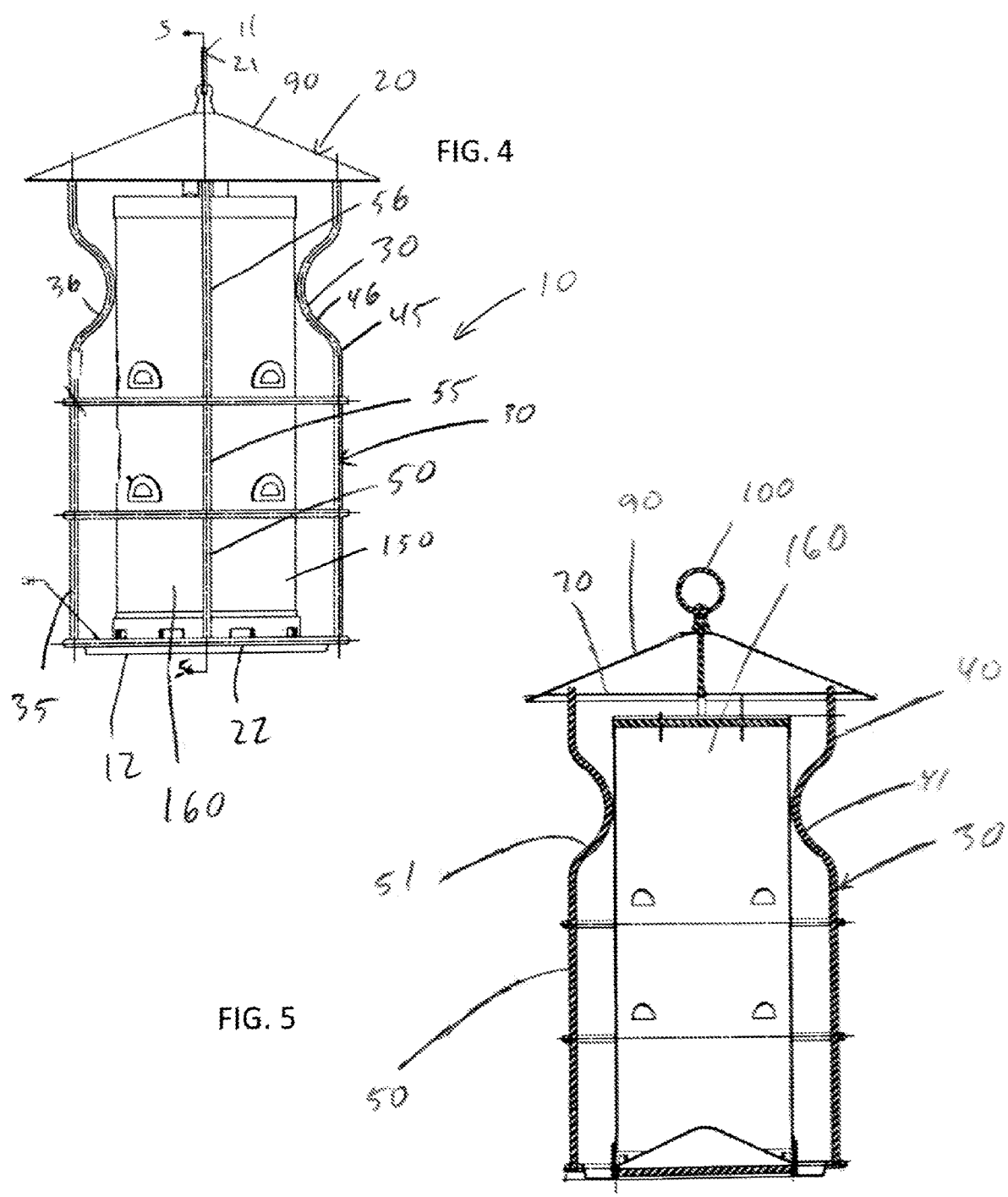

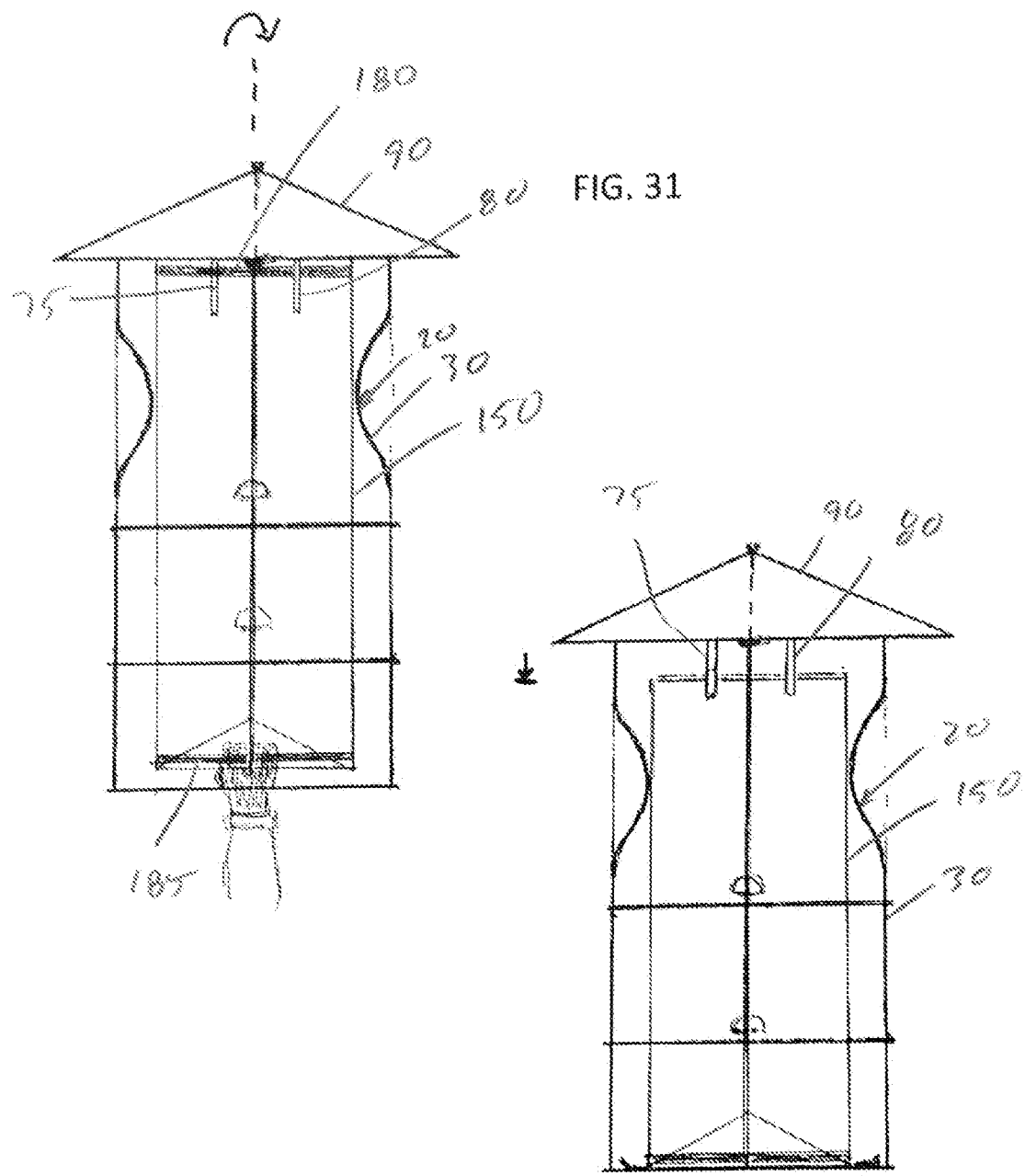
FIG. 31
FIG. 32
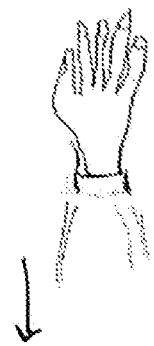

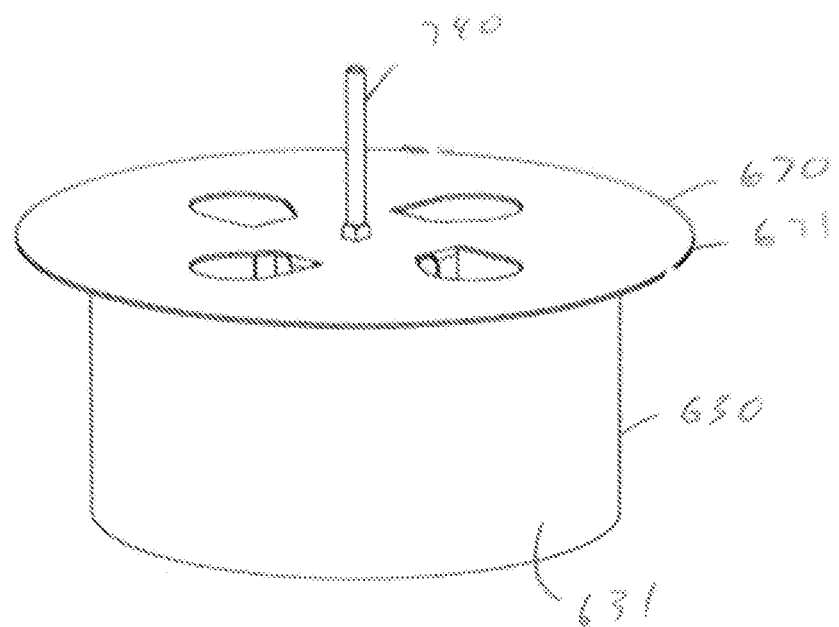
FIG. 44
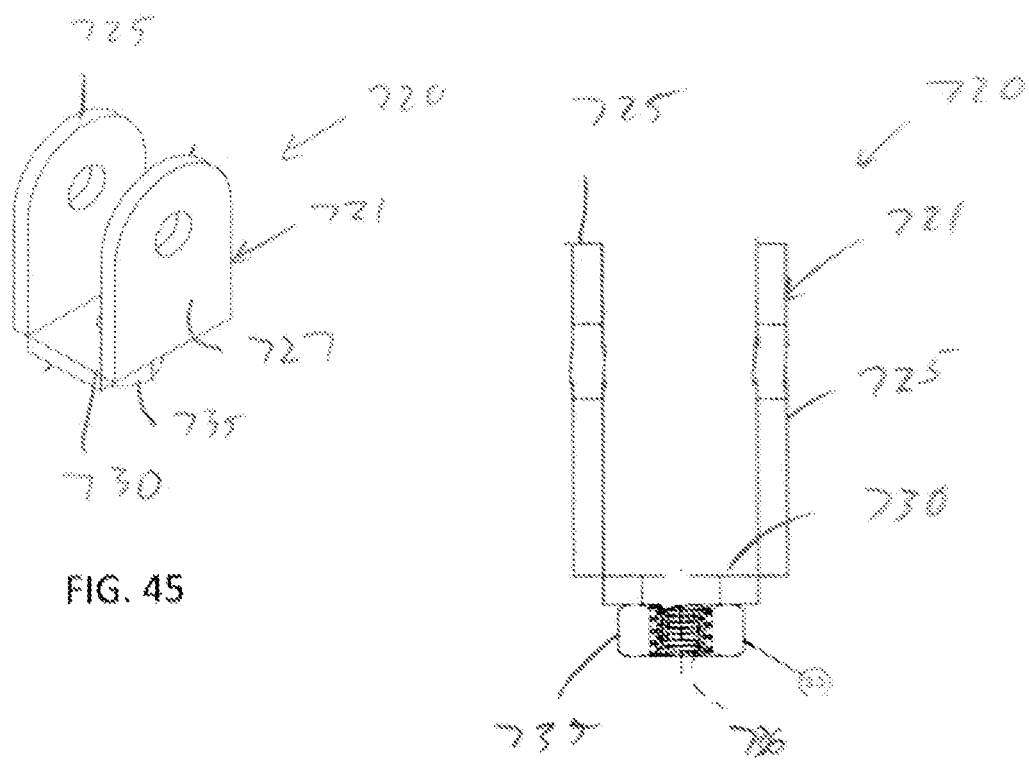
FIG. 45
FIG. 46

BIRD FEEDING SYSTEM

This United States utility patent application claims priority on and the benefit of provisional application 63/132,157 filed Dec. 30, 2020, the entire contents of which are hereby incorporated herein by reference.

BACKGROUND OF THE INVENTION

1. Field of the Invention

The present invention relates to a bird feeding system with a body and an insert, the insert being removed from the body to be refilled with bird food without removing the body from its support.

2. Description of the Related Art

Many people feed birds and there are many bird feeders that are available. In a basic bird feeder, the person has to remove the bird feeder from its support, unscrew or otherwise remove a cover, fill the feeder, replace the cover, and then replace the bird feeder back onto its support.

Normally, a person has to transport one or more bags to the feeder and return it or them to the house when the filling is complete. While this task is not inherently difficult when performed during pleasant weather, it can be time consuming and unpleasant when the weather is less than pleasant. As such, some people neglect to fill their bird feeders during unpleasant weather such as winter as hands are prone to freezing, screws are prone to binding and/or snow can make the task of lugging the bags to the feeder difficult. This is problematic, as winter is typically a time when birds can benefit the most from a reliable source of food. Further, some bags are heavy and awkward to handle, and some require the use of knives or pulling of strings. Still further, parts can be dropped and lost in snow and/or grass, making reassembly difficult while parts (or replacement parts) are being located.

Further, sometimes the top is not securely affixed to the body or is otherwise susceptible to inadvertent removal. In such a situation, there would be no barrier preventing rain or snow from entering the feeder causing food sogginess, rot and/or mold. Also, openings in conventional bird feeders can become clogged. The clogged food, when it gets wet, can be prone to molding. Birds are known to not eat moldy and soggy food.

Still further, feeders are often covered with bird droppings, though which disease can be transmitted. Handling of the conventional bird feeders during refilling potentially exposes the person to such diseases. Even absent disease transmission, refilling of a conventional bird feeder can be a messy proposition.

The filling of typical bird feeders can also lead to loss of bird food. Some people attempt to pour bird food into the top of a feeder and some of the bird food may miss the opening. Any spilt bird food not only misses the mark of feeding the birds, it can also attract pests.

Thus, there exists a need for a bird feeding system that solves these and other problems.

SUMMARY OF THE INVENTION

A bird feeding system is provided having a body and a removable insert. The insert can be removed and refilled without removing the body from its support. The body has a receiver that can be a cage, collar, roof or other structure that has a guide that receives the insert. A plate is attached to the top of the receiver. The plate has at least two hooks, each with a channel. The hooks are opposite facing. The insert has a cylindrical wall with feed opening therethrough. A top bar is used as a handle and also as a securing element that is selectably engaged with the hooks. A bottom bar is used to grip the insert for insertion, locking, unlocking and removal.

According to one advantage of the present invention, the feeding system is easy to use and fill.

According to another advantage of the present invention, the insert is easy to insert into the body. The body has a receiver that can act as a guide to direct the insert, which can be cylindrical, into the receiver. In one embodiment, the receiver is a cage having risers with indents. The indents can be vertically aligned within the cage and are advantageous for at least two reasons. First, the indents act as a guide to center the insert within the cage so that it is properly positioned for being in locking engagement with the cage. Second, once locked, the indents maintain the insert in the middle of the cage spaced from rings of the cage. The birds can rest on the rings and access feed holes in the insert.

According to another advantage of an embodiment of the present invention, the indents can be rounded on the bottom side so that the insert is gently guided towards the center of the cage without excessive resistance and without damaging the top of the insert if the insert is initially inserted off center with respect to the cage.

In another embodiment of the present invention, the receiver can be a collar. The collar can direct angled portions of the insert handle to center the insert within the collar, and hence the body.

In still a further embodiment of the present invention, the receiver can be an elongated roof in the shape of a cone. The inside of the cone centers the insert as it is being received within the receiver. The elongated and pitched roof can also be an effective squirrel deterrent.

According to a further advantage of the present invention, the insert can have a top bar. The top bar is useful as a handle when transporting the insert. The top bar is also used to lock the insert in place. This advantageously occurs when the bar is received within channels of the hooks of the body.

According to a still further advantage yet of the present invention, the insert can have a cylindrical in shape. This allows the insert to be rotated within the receiver. In this regard the hooks can be opposite facing hooks (align over channel from opposite directions) and the insert can be rotated until the bar engages the hooks, at which point the insert can be lowered to be received within the channels of opposite facing hooks so that the insert can hang from the hooks.

According to a further advantage of the present invention, the weight of gravity holds the insert within the channels, and accordingly, in a locked position.

According to a still further advantage yet of the present invention, the insert can be held in place by both the channels and the receiver. For example, the indents of the risers or inside collar wall or roof wall would laterally support the insert (relative to the top bar longitudinal axis). In this regard, swinging of the feed system does not cause the insert to disengage from the receiver (as they would be swinging together).

According to a still further advantage yet of the present invention, the body can have a hanger that is resistant to twisting about a vertical axis. This allows the body to remain rotationally stationary when the insert is being twisted into place.

According to a still further advantage yet of the present invention, the body can have one or two pairs of oppositely oriented hooks. In this regard, the insert can be locked in a four-hook embodiment by twisting the insert up to ¼ turn relative to the body.

According to a further advantage of the present invention, the insert can easily be unlocked from the cage in the opposite manner. That is, the insert is vertically moved from the channels, and the insert is then twisted with respect to the cage so that it can be removed as the upper bar clears the channels.

According to a still further advantage yet of the present invention, the insert can have a lower bar. The lower bar is useful to push the insert into the body, to twist the insert with respect to the body, and to remove the insert from the body. The lower bar can advantageously be concealed within the bottom of the insert for compactness and aesthetics or can be exterior of the insert for increased access.

According to a still further advantage of the present invention, insertion of the insert from the bottom allows feeder to be positioned higher from the ground, further away from varmints such as squirrels.

According to a still further advantage of the present invention the feeder can have a permanently affixed cover. Fixing the cover to the body eliminates the chance that the cover could inadvertently be removed from the body (e.g. wind, animals, etc.). Further, the cover can have a larger diameter than the body diameter which aids in keeping the food dry. This advantageously aids in maintaining the integrity of the bird food.

According to a still further advantage yet of the present invention, the user can carry an empty insert to a warm and/or dry environment for refilling. Further, the user can use either rod, or handle, to transport an empty insert as both handles will be free of droppings. A filled insert would normally be carried by the upper rod.

According to a still further advantage yet of the present invention, people generally handle the insert by the top and bottom bars, which are parts of the insert that the birds do not directly engage.

According to a further advantage yet of the present invention, the inserts can be reusable or disposable. Further, a user can swap a filled insert with an empty insert.

Other advantages, benefits, and features of the present invention will become apparent to those skilled in the art upon reading the detailed description of the invention and studying the drawings.

BRIEF DESCRIPTION OF THE DRAWINGS

FIG. 4 is a side view of the present invention.

FIG. 5 is a cross-sectional view taken along line 5-5 in FIG. 4.

FIG. 31 is similar to FIG. 30, but illustrates a different perspective.

FIG. 32 is similar to FIG. 31, but shows the insert lowered into the channels.

FIG. 44 is similar to FIG. 42, but shows the roof removed.

FIG. 45 is an isolation view of a hanger.

FIG. 46 is an end view of the hanger shown in FIG. 45.

DETAILED DESCRIPTION OF PREFERRED EMBODIMENTS

Figure 1:
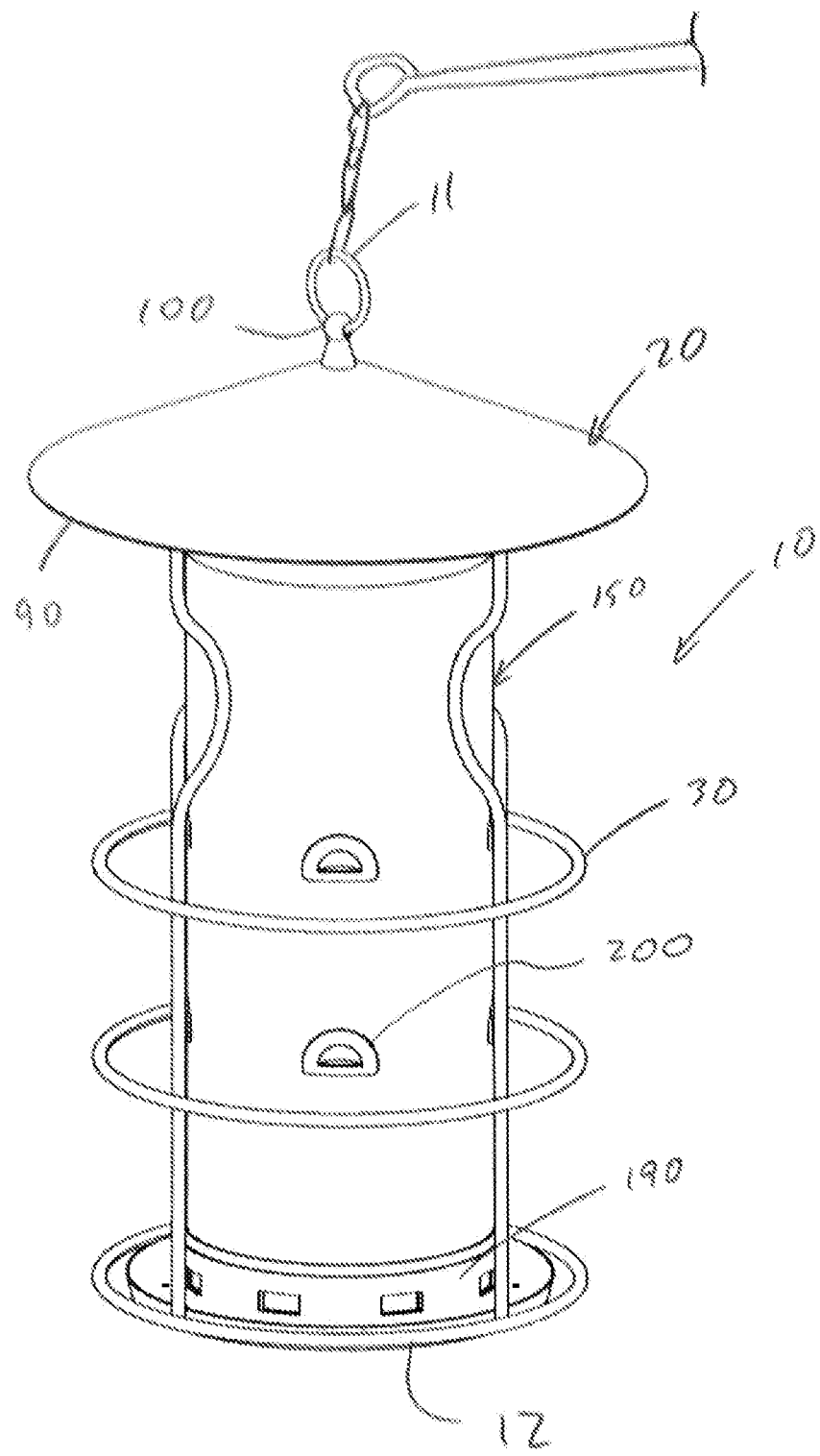
FIG. 1 is a perspective view of a preferred embodiment of the feeding system of the present invention.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Turning now to FIGS. 1-33, it is seen that a preferred embodiment of the present invention is illustrated. A feeder 10 is provided having a top 11 and a bottom 12. The feeder 10 preferably has a body 20 (with a receiver 30, a plate 70, a roof 90, and a hanger 100), an insert 150, a metering ring 190 and a feed attachment 200. Each of these components are described in detail below. It is appreciated that each of these components are not required.

Figure 6:
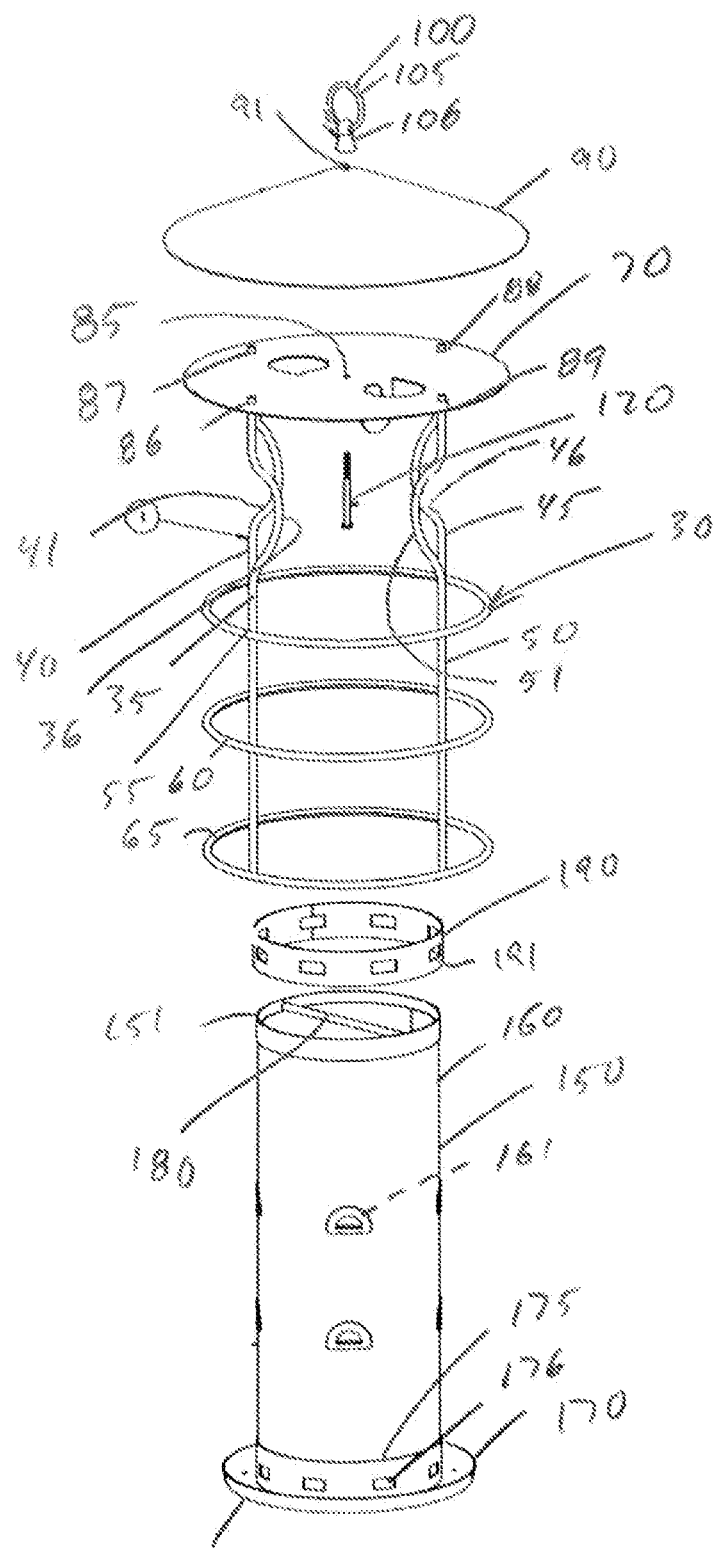
FIG. 6 is an exploded view of the present invention.
Figure 7:
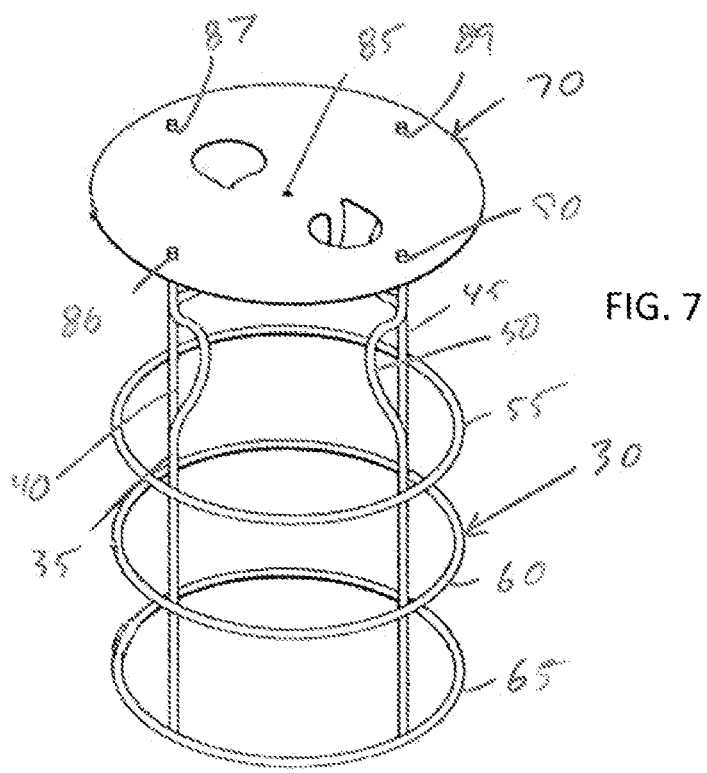
FIG. 7 is a top perspective view of the cage and plate.
Figure 8:
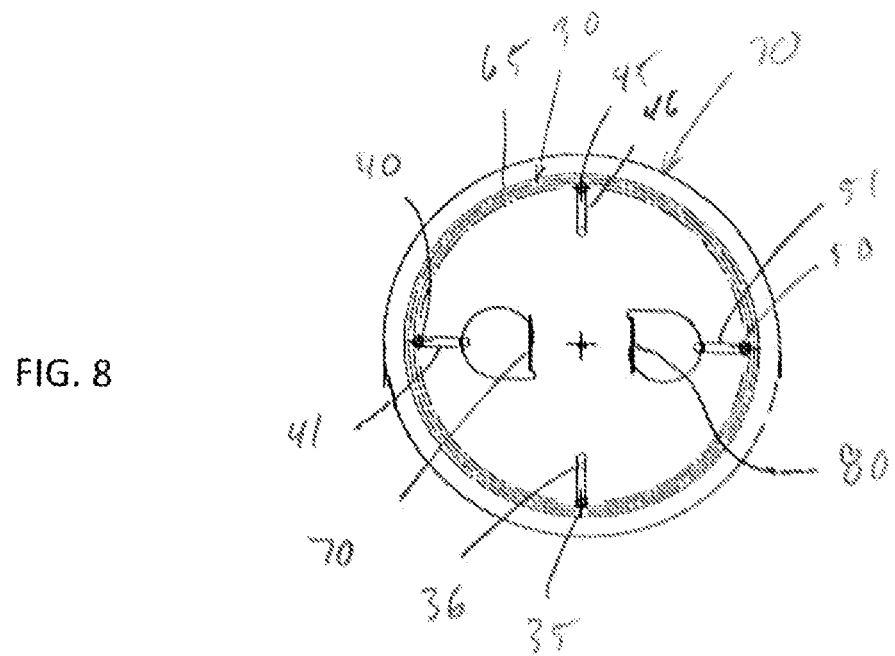
FIG. 8 is a bottom view of FIG. 7.
Figure 9:
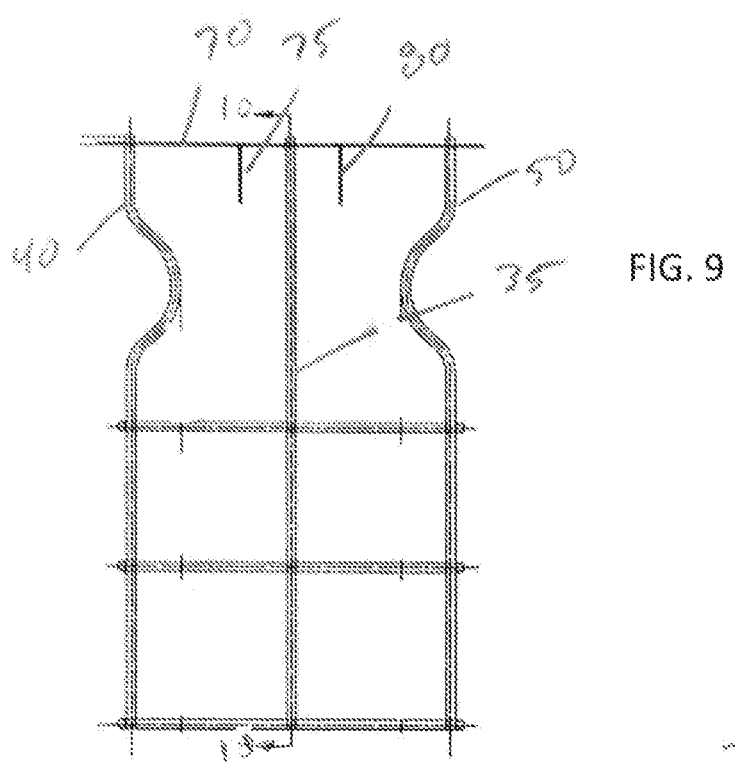
FIG. 9 is a side view of FIG. 7.
Figure 10:
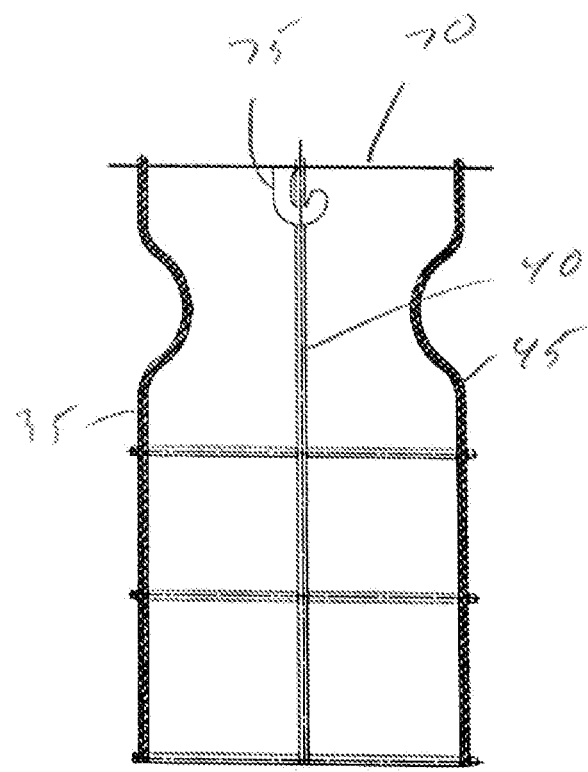
FIG. 10 is a cross-sectional view taken along line 10-10 in FIG. 9.

The feeder is shown in perspective view in FIG. 1, in side view in FIG. 4 (cross-section view in FIG. 5) and in an exploded perspective view in FIG. 6.

The body 20 has a top 21 and a bottom 22. The body 20 has a receiver 30 with a cage 31, a plate 70, a roof 90 and a hanger 100.

The receiver 30 is shown in FIGS. 7-10 among other figures. The receiver can be a cage 31, preferably having four risers 35, 40, 45 and 50. Riser 35 has an indent 36, riser has an indent 41, riser 45 has an indent 46 and riser 50 has an indent 51. Each riser is generally oriented vertically within the body 20. Each riser is preferably spaced equally about the perimeter of the body 20. Each indent is inwardly oriented (distance between indent and body central axis is less than distance between rest of risers and body central axis). The lower portion of each indent is preferably rounded. Alternatively, the lower portion of each riser can be angled without departing from the broad aspects of the present invention. Each indent is preferably generally vertically aligned with the other indents of the cage 31 so that the indents can act as a guide for the insert. The cage 31 preferably has three rings 55, 60 and 65, respectively. The rings preferably have a circular profile and are preferably connected to each of the four risers. The intersection of the risers and rings are preferably perpendicular.

Figure 11:
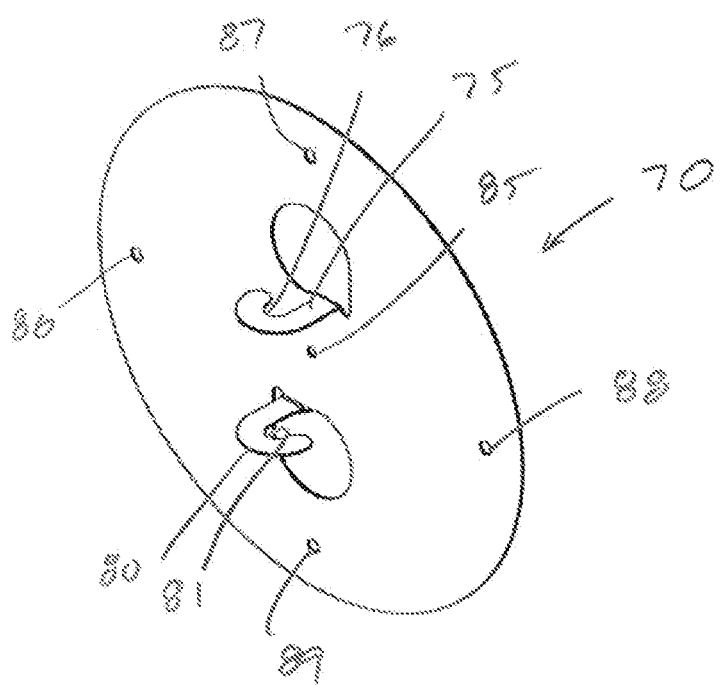
FIG. 11 is a perspective view of the plate of the present invention.

Keeping with FIGS. 7-10, and also looking at FIG. 11, it is seen that a preferred embodiment of a plate 70 is illustrated. The plate 70 has a first hook 75 and a second hook 80. The first hook 75 has a channel 76 and the second hook 80 has a channel 81. A central hole 85 is formed preferably through the geometric center of the plate. Four perimeter holes 86, 87, 88 and 89 are through the plate and are preferably spaced about the perimeter of the plate 70. Hooks 75 and 80 are opposite facing hooks. Each is preferably generally J-shaped. The opposite facing hooks is achieved by orienting the J-shaped hooks in opposite directions. Each channel 76 and 81 preferably have the same depth. The channels 76 and 81 are formed in the bottom of the J-shape, and each channel has an outer upper edge (top of shorter vertical portion of "J") and an inner back wall (longer vertical portion of "J").

The cage 31 is preferably connected to the plate 70. The upper end of each riser 35, 40, 45 and 50 is inserted through a perimeter hole 86-89. The connection can be made by a number of suitable methods, including but not limited to crimping, a nut on a threaded end of a riser, welding, adhesive, etc. The cage 31 and plate 70 are preferably rigidly held in relation to each other.

Figure 12:
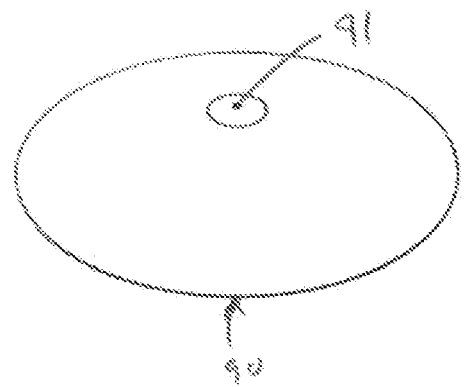
FIG. 12 is a perspective view of a cover of the present invention.
Figure 13:
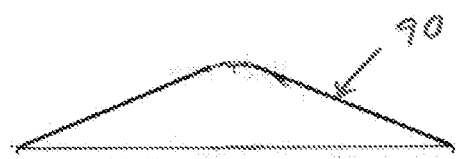
FIG. 13 is a side view of the cover.

A roof 90 is provided as seen in FIGS. 12 and 13. The roof has a generally round profile at a lower edge and is raised from the outer perimeter towards a raised center that is tapered at the top, resulting in a general cone shape with a radiused top. A central hole 91 is formed through the top 90.

Figure 14:
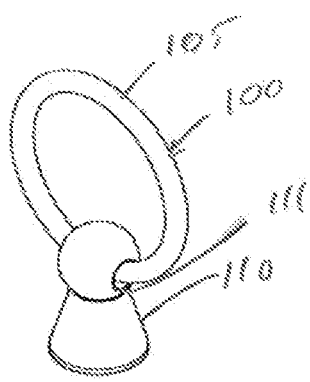
FIG. 14 is a perspective view of a hanger of the present invention.
Figure 15:
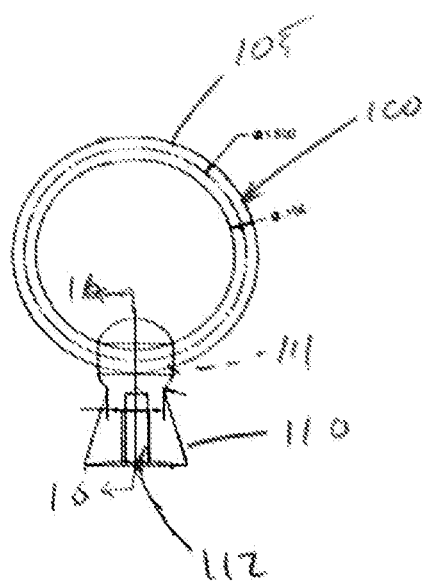
FIG. 15 is a side view of the hanger.
Figure 16:
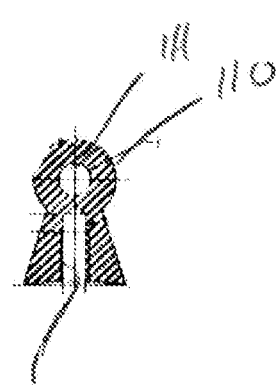
FIG. 16 is a cross-sectional view taken along line 16-16 in FIG. 15.
Figure 17:
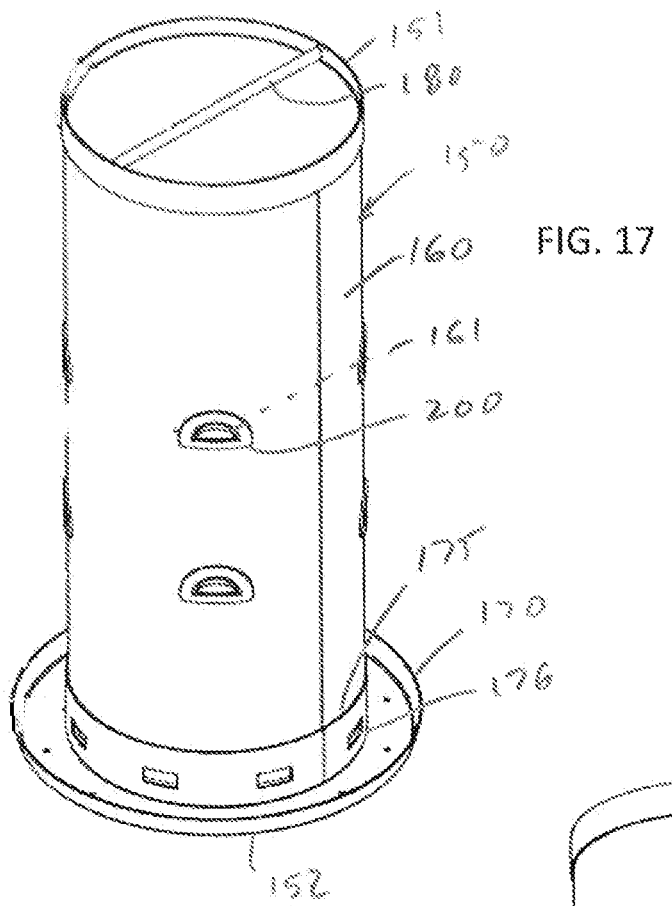
FIG. 17 is an upper perspective view of a preferred embodiment of the insert.
Figure 18:
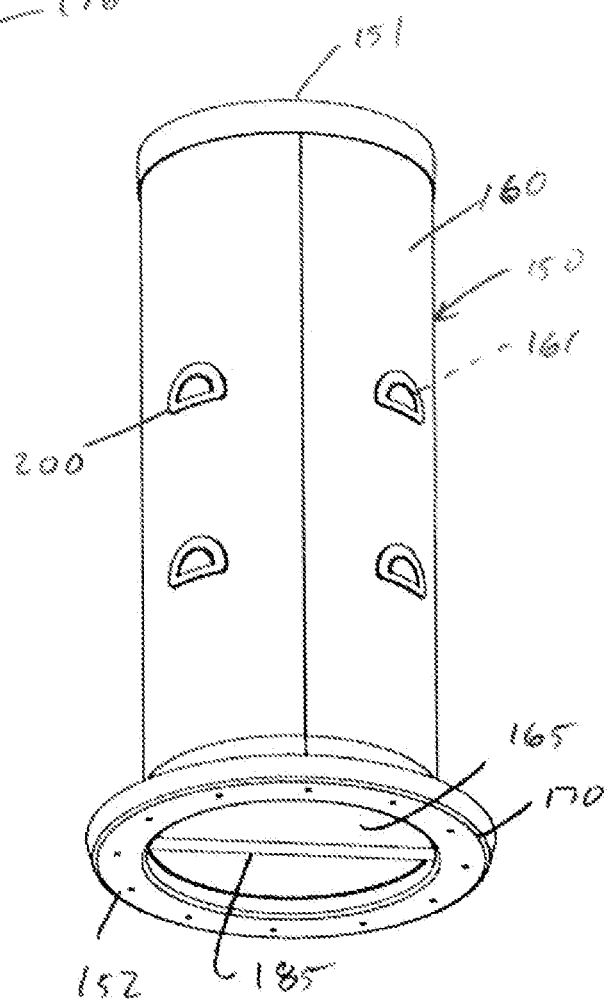
FIG. 18 is a lower perspective view of the insert.
Figure 19:
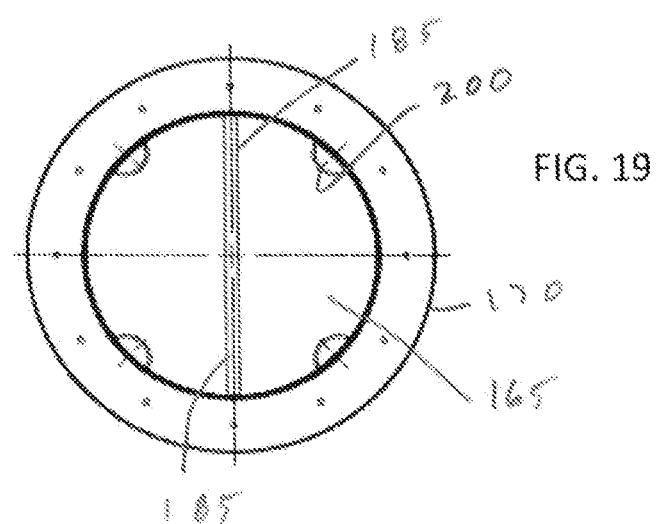
FIG. 19 is a top view of the insert.
Figures 20, 21:
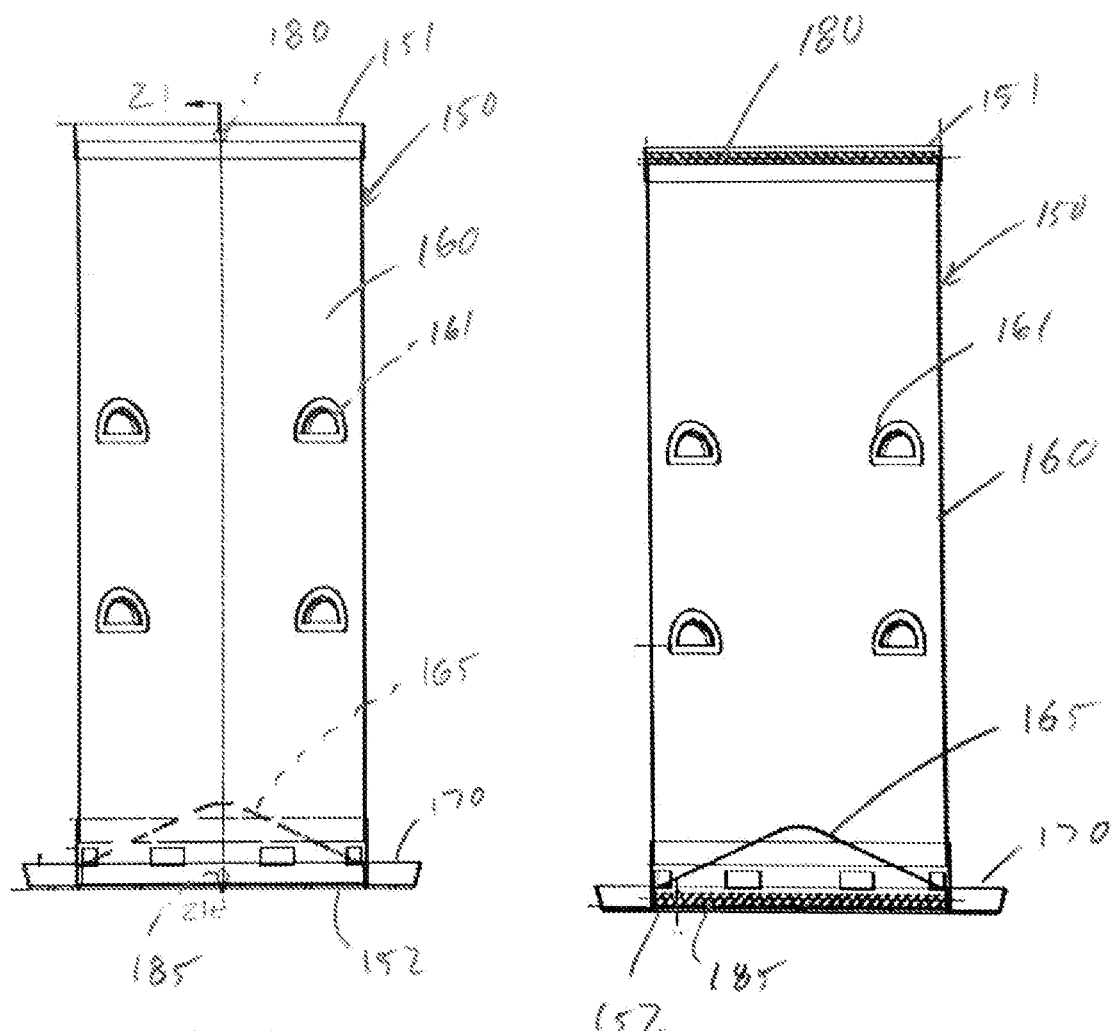
FIG. 20 is a side view of the insert.
FIG. 21 is a cross-sectional view taken along line 21-21 in FIG. 20.

A preferred embodiment of a hanger 100 is illustrated in FIGS. 14-16. The hanger 100 has a ring 105 at the top and a base 110 at the bottom of the ring 100. The base 110 has a ring hole 111 and a central hole 112. The ring 110 passes through the ring hole 111 and is rotatable relative thereto and slidable therein. The central hole is preferably threaded to receive a threaded end of a screw 120.

The screw 120 has the threaded end and a head. The threaded end of screw 120 can pass through hole 85 in the plate 80, central hole 91 in the roof 90 and into central hole 112 in the base 110 of the hanger 100 to secure these components together when the head of the screw 120 engages the underside of the plate 70 when the screw is sufficiently received within the base hole 112.

A preferred embodiment of an insert 150 is illustrated in FIGS. 17-21. The insert has a top 151 and a bottom 152. The top 151 of the insert is preferably generally open and the bottom of the insert is preferably generally closed in directions parallel to an insert longitudinal axis. The insert preferably has a cylindrical shaped wall 160. The wall 160 preferably has a plurality of feed openings 161 therethrough. There are eight feed openings 161 in the illustrated embodiment, with the openings being arranged in four equally spaced groups of two openings about the perimeter of the wall 160, wherein each group of two is vertically oriented through the wall.

Figure 23:
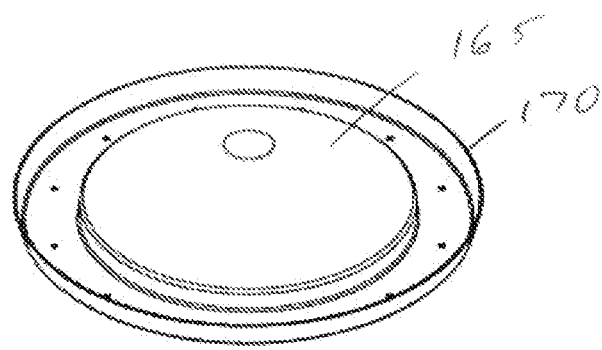
FIG. 23 is a perspective view of an integrated cone and tray of the present invention.
Figure 24:
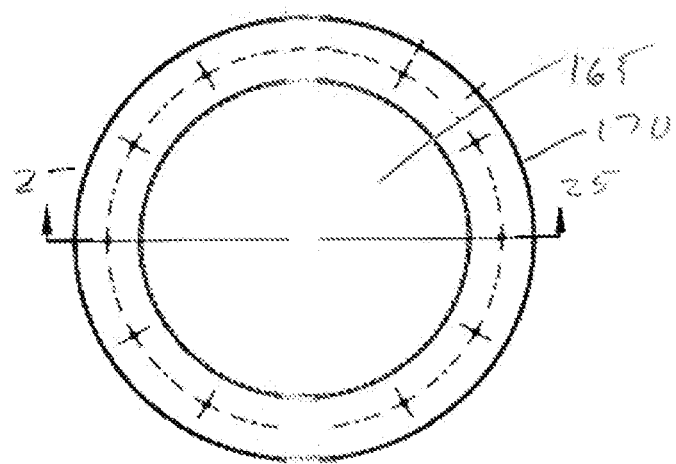
FIG. 24 is a top view of FIG. 23.
Figure 25:
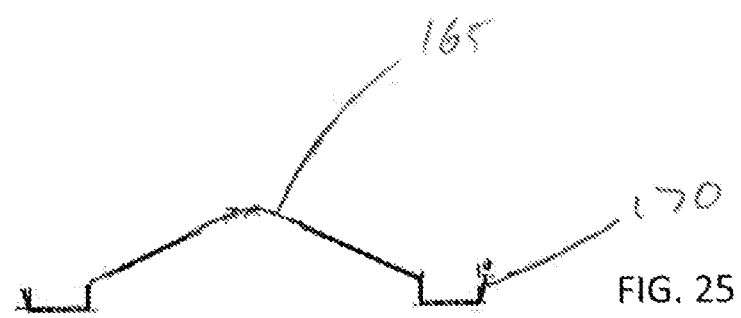
FIG. 25 is a cross-sectional view taken along line 25-25 in FIG. 24.

An integrated cone 165 and tray 170 are illustrated in FIGS. 23-25. The cone 165 has a central peak an a round lower perimeter. The tray 170 is preferably round and has an outer raised lip. The cone and tray are below the bottom of the cylinder wall 160.

Returning to FIGS. 17-21, it is seen that a base ring 175 is also provided. The base ring 175 is round has base openings 176. The base ring 175 is connected to the bottom of the cylinder wall 160 (in an alternative embodiment, the base ring can be inside or outside of the bottom of the cylinder wall and aligned with holes in the bottom of the cylinder wall).

The insert 150 also has rod 180 at the top 151 of the insert and a rod 185 at the bottom 152 of the insert 150. Rod 180 preferably is a round rod with a linear axis. The ends of the rod 180 preferably connect to the wall 160 at diametrically opposed locations. Rod 185 preferably is a round rod with a linear axis. The ends of the rod 185 preferably connect to an inner wall of the tray 170 of the insert 150 at diametrically opposed locations.

Figure 22:
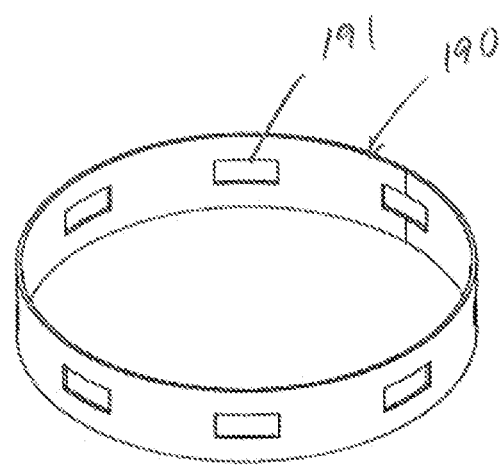
FIG. 22 is a perspective view of an embodiment of a metering ring of the present invention.

A metering ring 190 is provided and is illustrated in isolation in FIG. 22. The metering ring 190 is preferably circular in shape and has openings 191 therethrough. The metering ring 190 is concentric with ring 175 during operation. Metering ring can be rotated relative to the insert cylinder wall 160. The metering ring 190 can conceal the openings 176 in the base ring 175 in a closed position. The openings 191 and openings 176 can be fully aligned in a fully open position and partially aligned in a partially opened position. Use of the metering ring 190 is optional and the present invention could be used without one.

Figure 26:
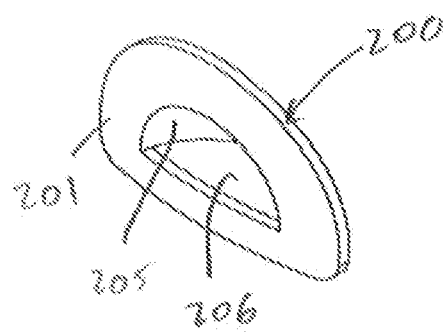
FIG. 26 is a perspective view of a preferred embodiment of a feed attachment of the present invention.
Figure 27:
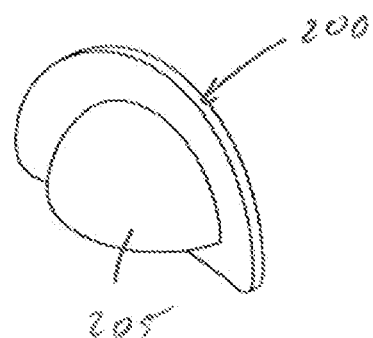
FIG. 27 is a reverse perspective view of FIG. 26.

Turning now to FIGS. 26 and 27, it is seen that a preferred embodiment of feed attachments 200 is provided. Each feed attachment 200 has a face 201, a hood 205 and an opening. There is preferably one feed attachment 200 associated with, and connected to each feed opening 161 through the cylinder wall 160. The opening 206 is preferably downward facing and is covered by the hood 205. In this regard, the hood 205 prevents seed and feed from inadvertently falling out of the feeder.

A safety harness 210 with a clip 211 is provided. One end of the harness is connected to the lower rod 185 of the insert 150 and the clip 211 is on the other end. When the insert 150 is fully received within the body 20, the clip 211 can be secured to cage 31 to prevent the insert from falling from the cage if the top rod 180 becomes disengaged from the hoods 75 and 80.

The process of inserting the insert 150 into the body 20 is illustrated in FIGS. 28-32.

Figure 28:
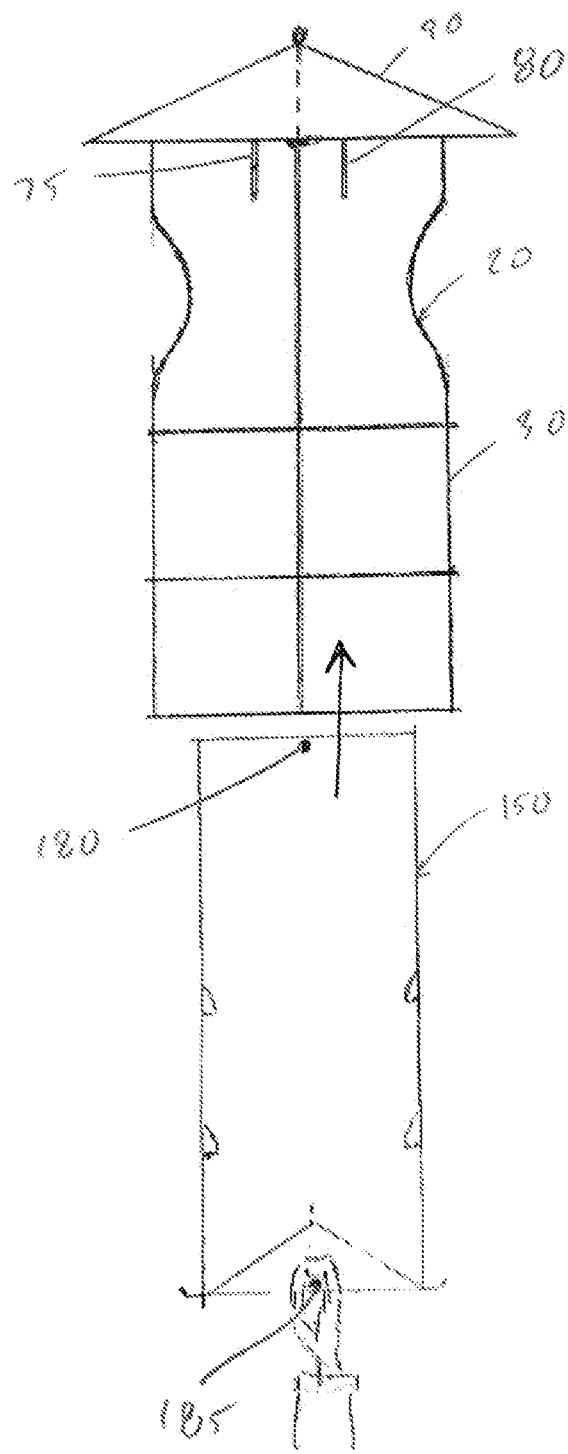
FIG. 28 is a side view showing the insert below the body.
Figure 29:
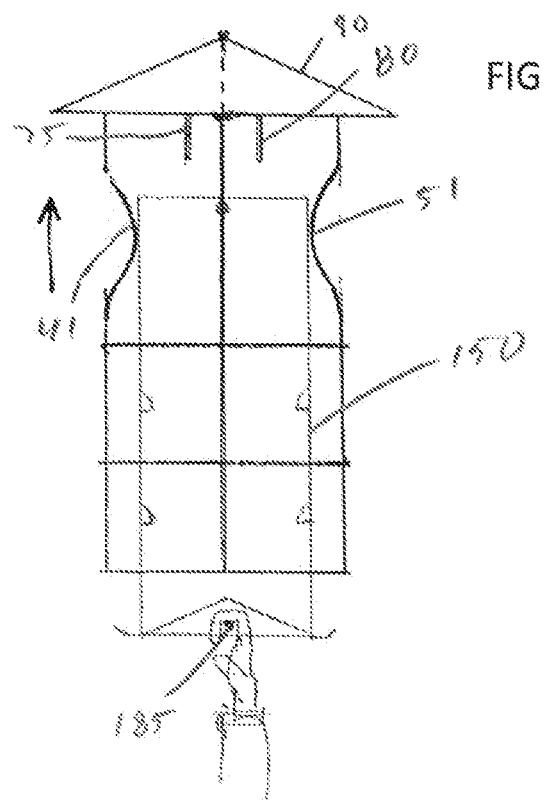
FIG. 29 is similar to FIG. 28, but shows the insert being received within the cage and being centered by the indents.
Figure 30:
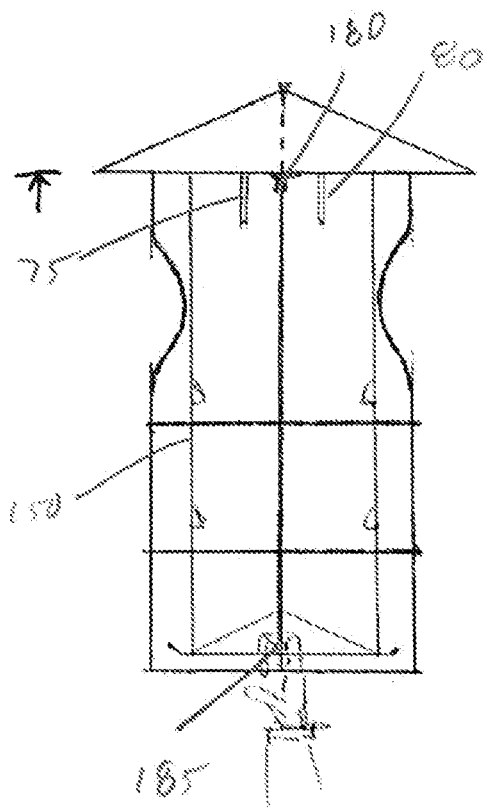
FIG. 30 is similar to FIG. 29, but shows the insert positioned at the top of the cage above the channels.

Looking now at FIG. 28, it is seen that a user grabs the lower rod 185 with their hand and aligns the insert 150 with the bottom of the cage 31 (which is open). The user then pushes the insert 150 vertically into the lower portion of the cage 31. Turning to FIG. 29, it is seen that the indents 36, 41, 46 and 51 center the insert 150 as it is being vertically moved into the body 20. Turning now to FIG. 30, it is seen how the insert 150 is moved until it is fully received within the body. In this position, it is noteworthy that the top rod 180 is higher than the upper outer edge of channels 76 and 81. The user then, as seen in FIG. 31, can twist the insert 150 relative to the body 20 via the lower rod 185 to cause the upper rod 180 to contact the back wall of the hooks 75 and 80. The insert 150 then, as seen in FIG. 32, can be lowered into the channels 76 and 81 and the user can disengage from the lower rod 185.

Figure 2:
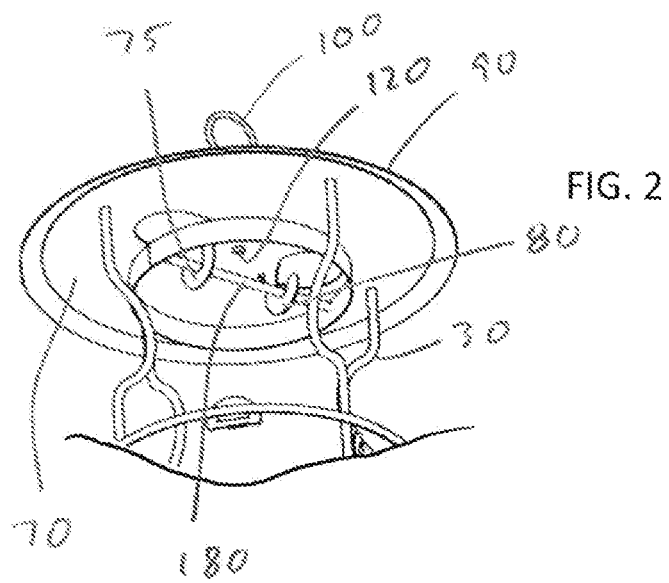
FIG. 2 is a partial perspective view showing an upper bar received within hooks.
Figure 3:
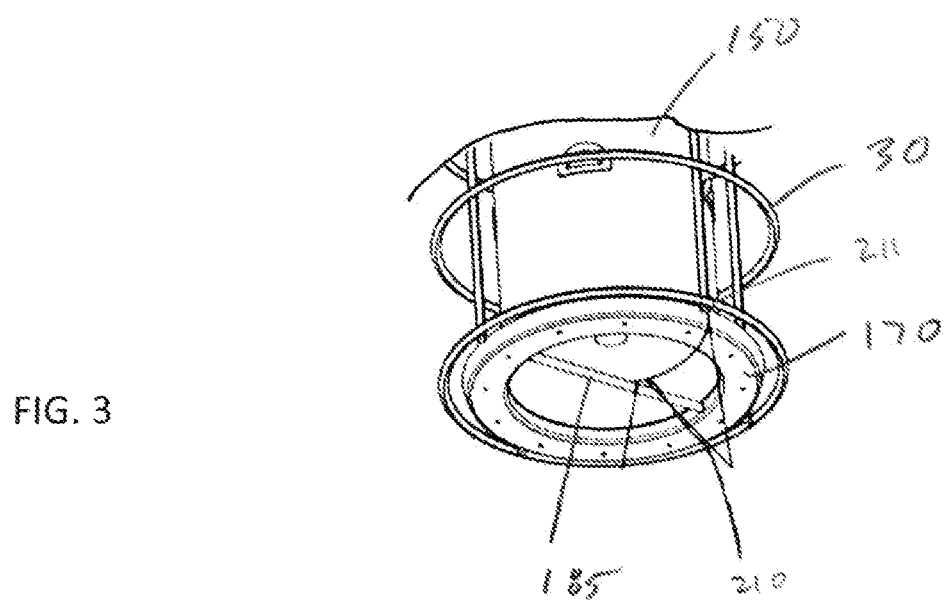
FIG. 3 is a partial perspective view showing a lower bar.
Figure 33:
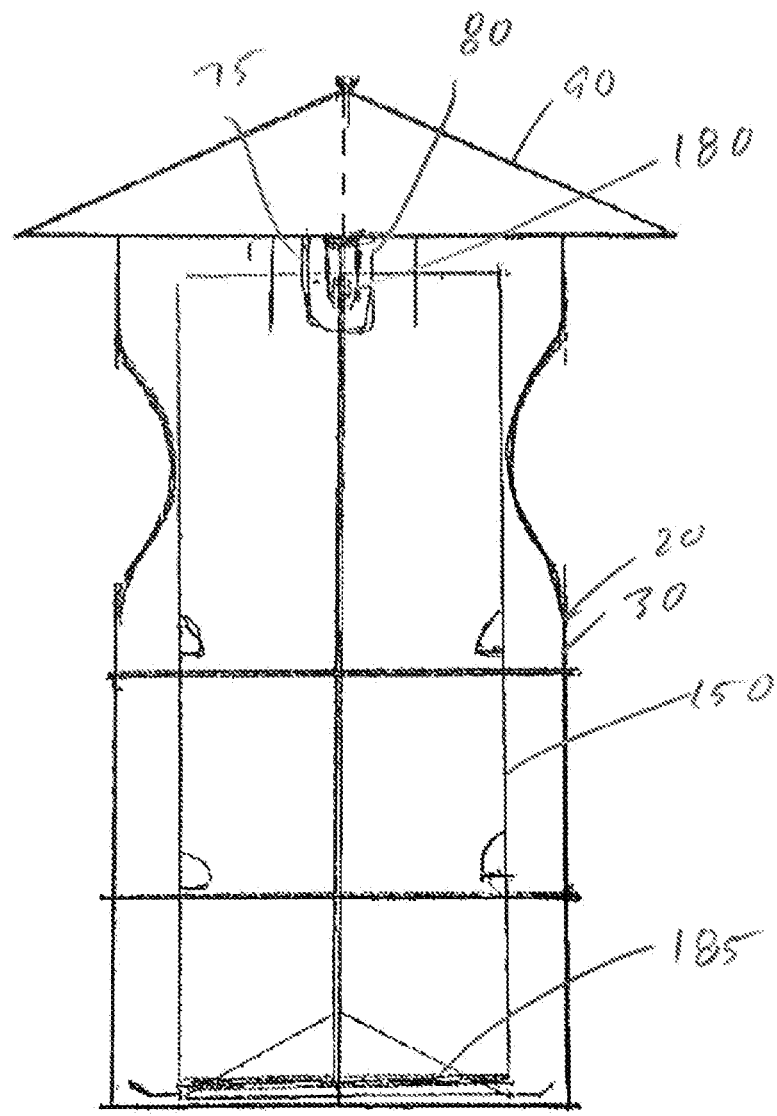
FIG. 33 is similar to FIG. 32, but illustrates a different perspective.

FIG. 33 is similar to FIG. 32, but shows the upper rod 180 engaging the hooks from the perspective of looking along the longitudinal axis of the upper rod 180. A perspective view of the upper rod 180 resting in the hooks 75 and 80 is illustrated in FIG. 2.

The insert can be removed in the opposite manner. Namely, the user can vertically raise the insert 150 with the body 20 until the upper rod 180 is removed from the channels 76 and 81, the user uses the lower rod 185 to twist the insert 150 so that the insert clears the hooks 75 and 80 when it is removed from the cage 31 by lowering it from the cage.

Figure 34:
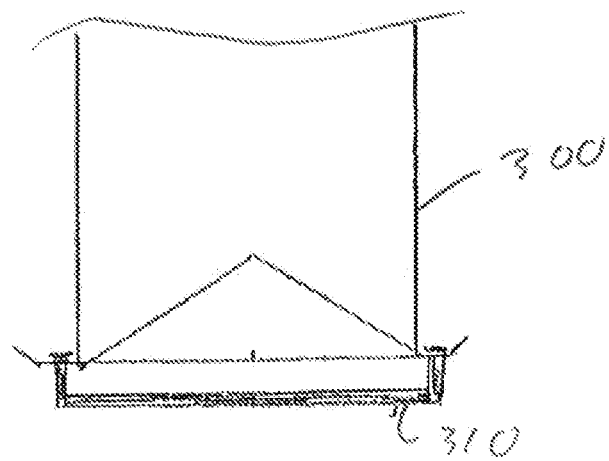
FIG. 34 is a partial side view of an alternative lower bar.
Figure 35:
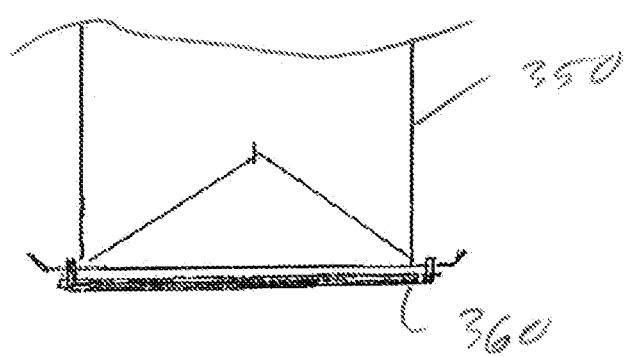
FIG. 35 is a partial side view of an alternative lower bar.

An alternative insert 300 with a lower bar 310 is illustrated in FIG. 34. A further alternative insert 350 with a lower bar 360 is illustrated in FIG. 35. In each alternative, the respective lower bar is below the plane of the tray 170. In this regard, the lower rod can be more accessible to the user in these embodiments.

Figure 36:
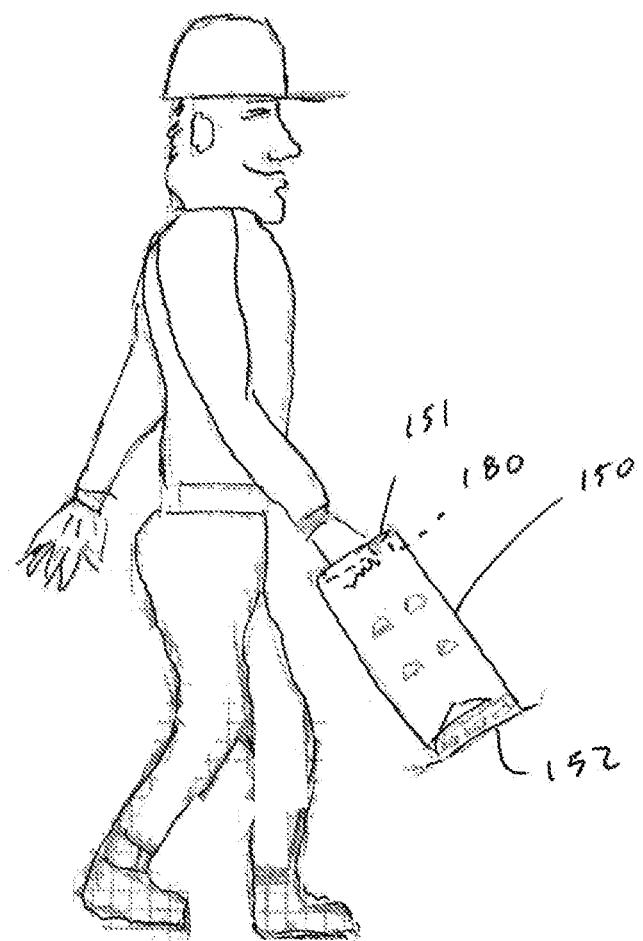
FIG. 36 is an illustration showing a person transporting an insert.

A person can use either the upper or lower rod to transport an empty insert. FIG. 36 shows a person transporting an insert by the upper rod or handle.

Figure 37:
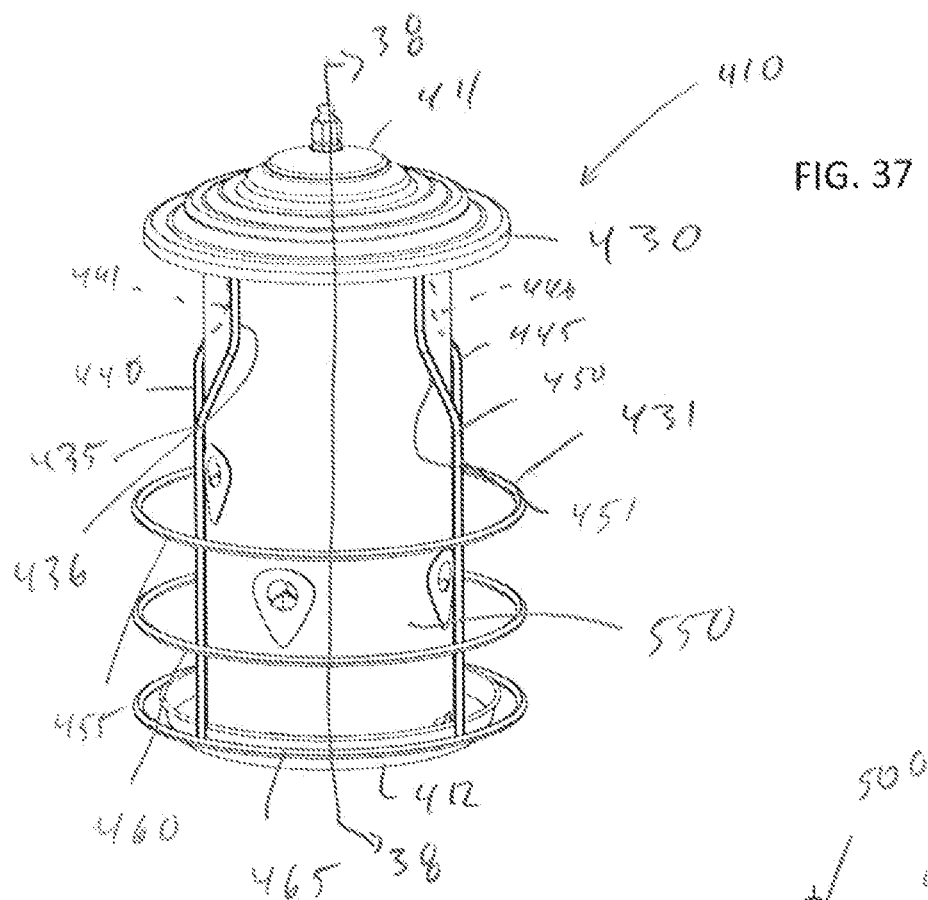
FIG. 37 is a perspective view of an alternative receiver cage design.
Figure 38:
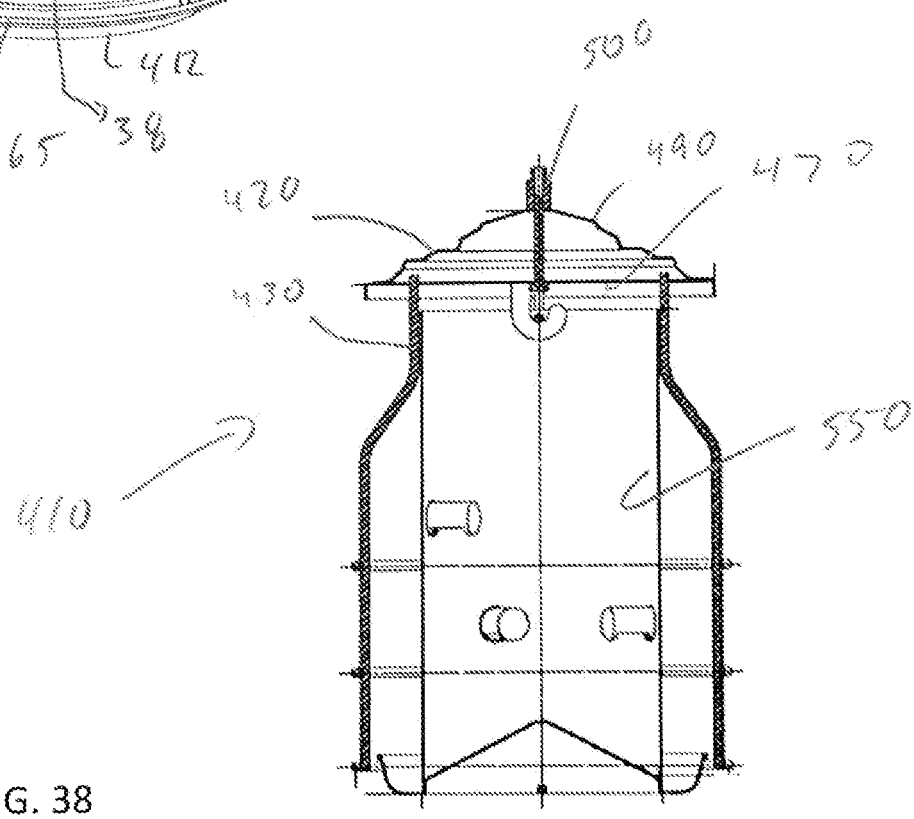
FIG. 38 is a cross-sectional view taken along line 38-38 in FIG. 37.

Turning now to FIGS. 37-38, it is seen that an alternative embodiment of a feeder 410 is illustrated. The feeder 410 has a top and a bottom. The feeder 410 preferably has a body 420 (with a receiver 430, a plate 470, a roof 490, and a hanger 500), and an insert 550. Each of these components are described in detail below. It is appreciated that each of these components are not required.

The body 420 has a top and a bottom. The body 420 has a receiver 430 with a cage 430, a plate 470, a roof 490 and a hanger 400.

The receiver 430 can be a cage 431, preferably having four risers 435, 440, 445 and 450. Riser 435 has an indent 436, riser 440 has an indent 441, riser 445 has an indent 446 and riser 450 has an indent 451. Each riser is generally oriented vertically within the body 420. Each riser is preferably spaced equally about the perimeter of the body 420. Each indent is inwardly oriented (distance between indent and body central axis is less than distance between rest of risers and body central axis). The lower portion of each indent is preferably rounded. Alternatively, the lower portion of each riser can be angled without departing from the broad aspects of the present invention. Each indent is preferably generally vertically aligned with the other indent of the cage 431 (at the top of the respective risers) so that the indents as a guide for the insert. The cage 431 preferably has three rings 455, 460 and 465, respectively. The rings preferably have a circular profile and are preferably connected to each of the four risers. The intersection of the risers and rings are preferably perpendicular.

Plate 470 is preferably the same as plate 70. Roof 490 is preferably the same as roof 90. Hanger 500 is preferably the same as hanger 100.

The insert 550 is inserted into and removed from the body 420 in a similar manner as insert 150 is inserted into and removed from body 20.

Turning now to FIGS. 39-51, it is seen that a further preferred embodiment of the present invention is illustrated. A feeder 610 is provided having a top 611 and a bottom 612. The feeder 610 preferably has a body 620 (with a receiver 630, a plate 670, a roof 690, and a hanger 700), an insert 750 (with a feed attachment 820). Each of these components are described in detail below. It is appreciated that each of these components are not required. The feeder is shown in a side view in FIG. 39 and in cross-section in FIG. 40.

The body 620 has a top 621 and a bottom 622. The body 620 has a receiver 630 with a collar 631, a plate 670, a roof 690 and a hanger 700.

The receiver 630 is shown in FIGS. 39-44. The receiver can be a collar 631 having a wall 635 that is generally cylindrical, having a top 636, a bottom 637, an inside surface 638 defining an inside and an outside surface 639.

The plate 670 has an outer perimeter 671. Four hooks 675, 680, 685 and 690, are provided, each having a channel 676, 681, 686 and 691, respectively. The hooks are preferably J-shaped hooks. Hooks 675 and 680 are oppositely facing hooks and form a first pair of hooks. Their channels 676 and 681 are horizontally aligned along a first pair channel axis. Hooks 685 and 690 are oppositely facing hooks and form a second pair of hooks. Their channels 686 and 691 are horizontally aligned along a second pair channel axis. The first pair channel axis is preferably perpendicular to the second pair channel axis. A central hole 700 is formed through the plate 670. The hole 700 is preferably a square hole.

The collar 631 and plate 670 are preferably stationarily fixed to each other, wherein the plate 670 cannot rotate relative to the receiver 630.

Figure 39:
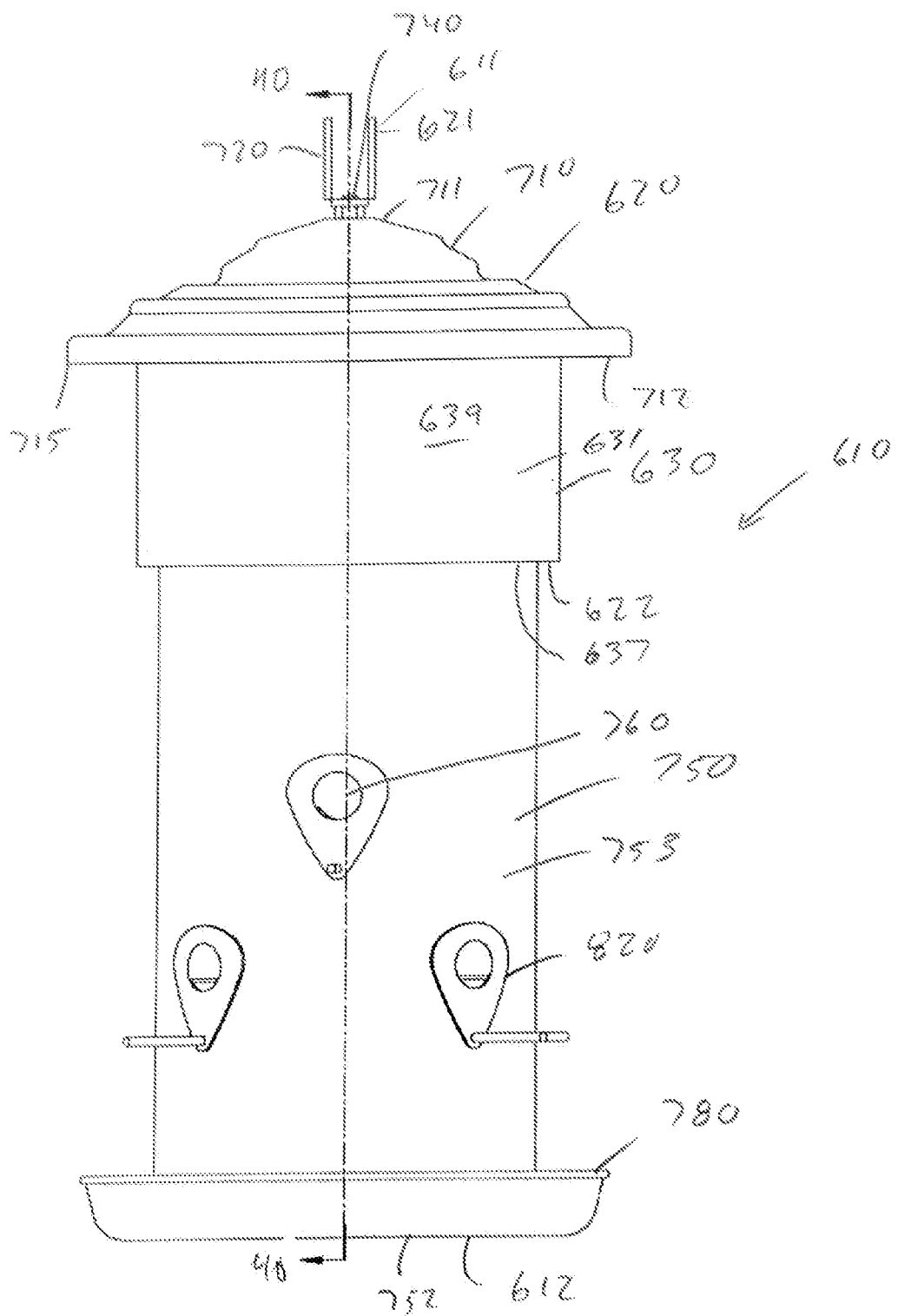
FIG. 39 is a side view of an alternative embodiment of the present invention.
Figure 40:
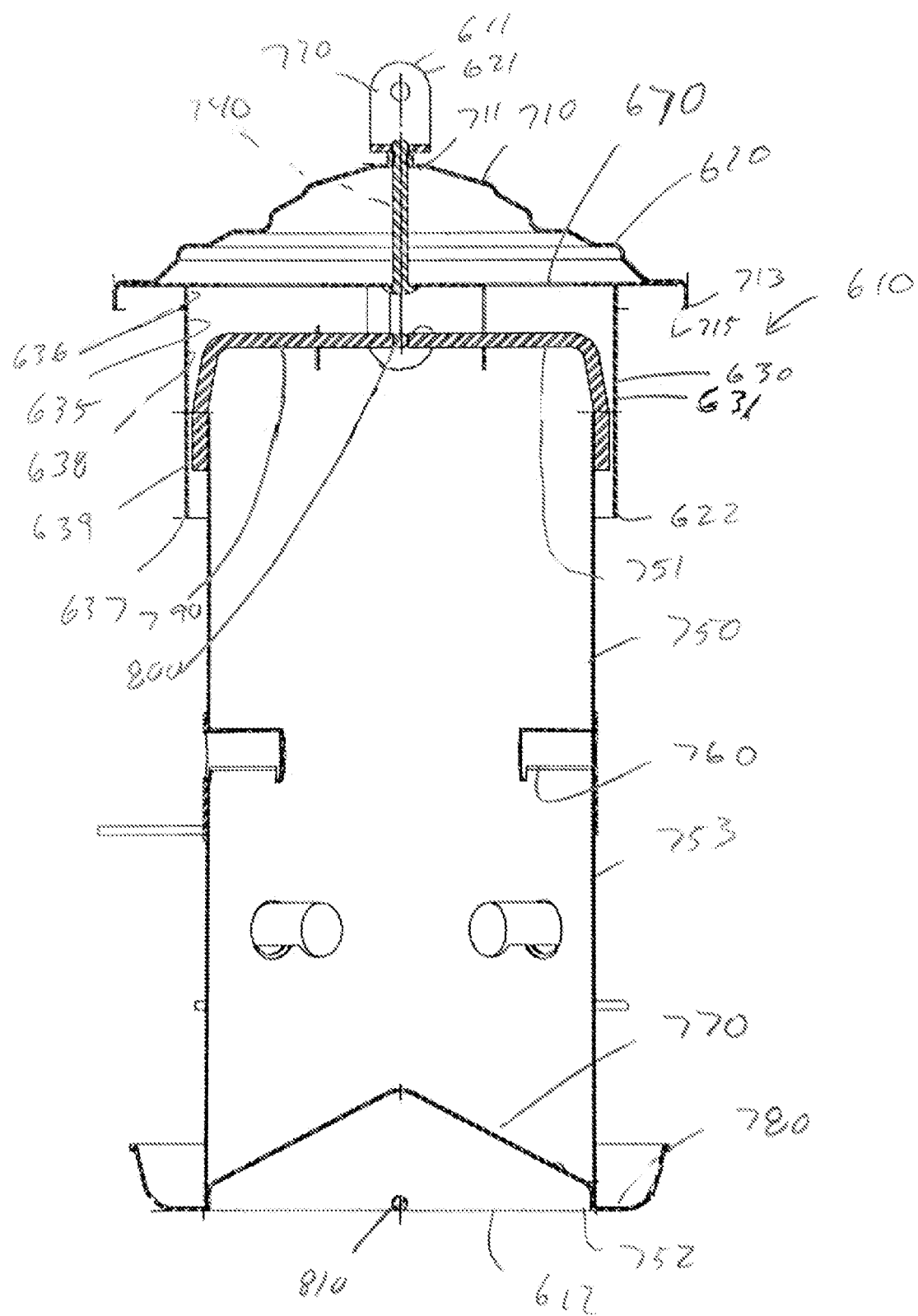
FIG. 40 is a cross-sectional view taken along line 40-40 in FIG. 39.

The roof 710, seen in FIGS. 39 and 40, among other figures. The roof has a generally round profile at a lower edge and is raised from the outer perimeter towards a raised center that is tapered at the top 711, resulting in a general cone shape with a radiused top. A central hole 712 is formed through the top 710.

A preferred embodiment of a hanger 720 is illustrated in FIGS. 45 and 46. The hanger 720 is a clevis 721 having ears 725 and 726, a base 730, and a post 735 with an internally threaded hole 736. The ears 725 and 727 have aligned holes that allow a pin to pass. The hanger can rotate about the horizontal axis of the pin. Yet, the hanger 720 cannot spin about a vertical axis relative to the pin. Further, when the hanger is pinned to a rigid support, the body will not twist relative to the support about a vertical axis.

A screw 740 with a threaded end and a head is provided to join the connected receiver 630 and plate 670 with the roof 710 and hanger 720. The screw passes through holes 700 and 712 and is received within hole 736. The portion of the shaft immediately adjacent to the head is preferably square. In this regard, the screw 740 is remain rotationally stationary with respect to the plate 670 when the screw 740 and hanger 720 connect the body together. The head is preferably a smooth domed head. In this regard, a bar that contacts the head will be unlikely to abut the head and instead will pass below it due to the low profile of the head. Alternatively, the head could have a hex shape or other shape.

Figure 41:
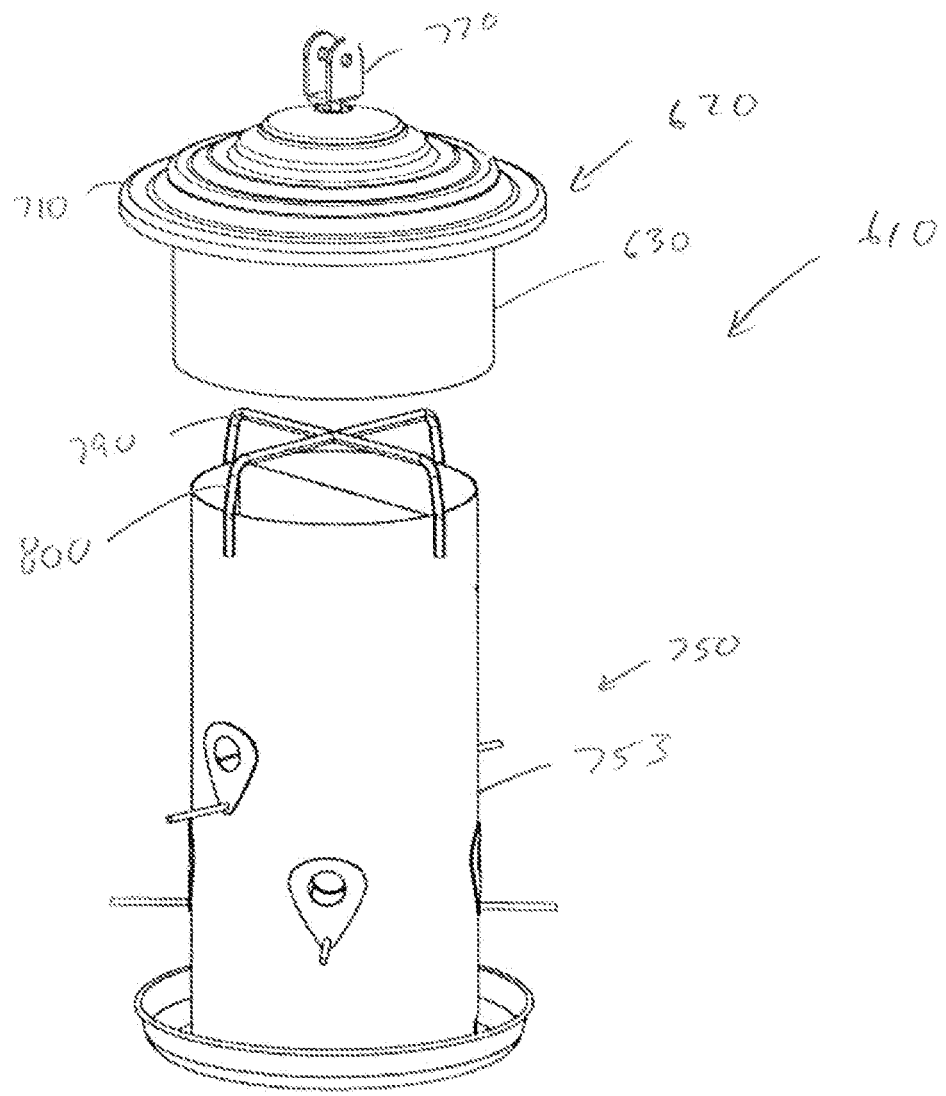
FIG. 41 is an exploded view of the embodiment illustrated in FIG. 39.
Figure 42:
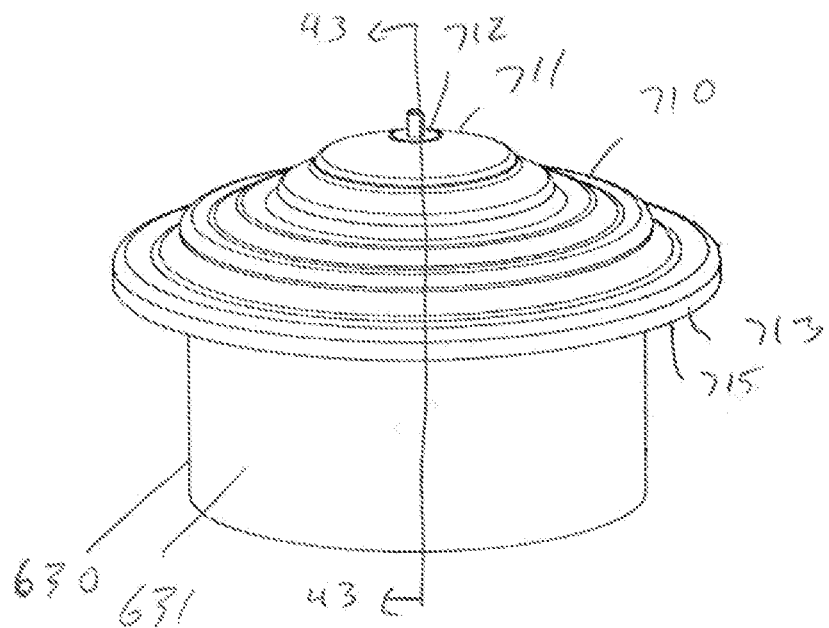
FIG. 42 is an isolation view of the body without a hanger attached.
Figure 43:
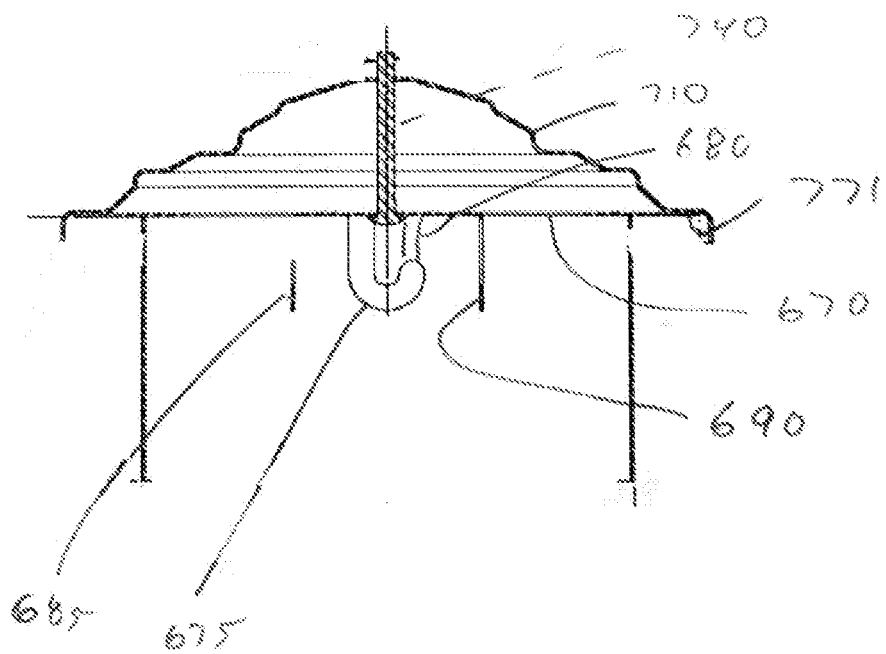
FIG. 43 is a cross-sectional view taken along line 43-43 in FIG. 42.
Figure 47:
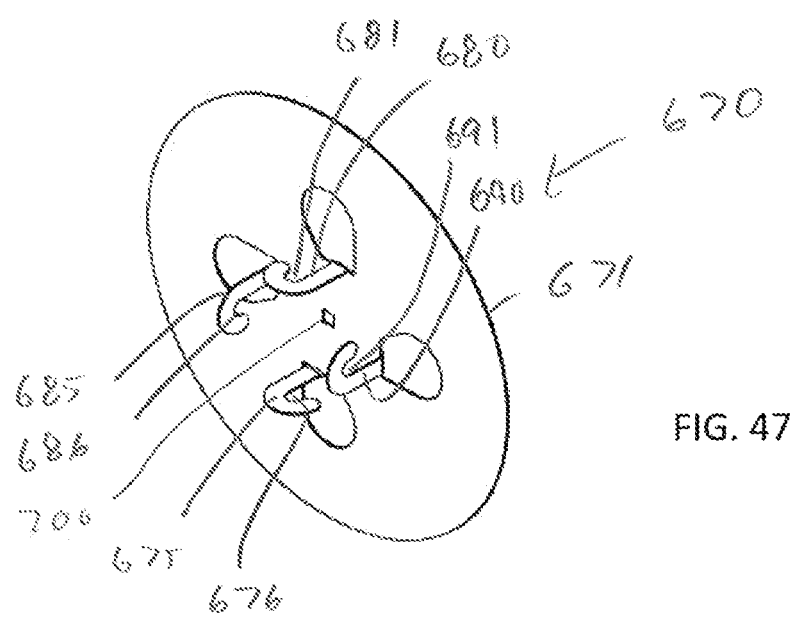
FIG. 47 is an isolation view of a plate.

A preferred embodiment of an insert 750 is illustrated in FIGS. 39-41, among other figures. The insert 750 has a top 751 and a bottom 752. The top 751 of the insert is preferably generally open and the bottom of the insert is preferably generally closed in directions parallel to an insert longitudinal axis. The insert preferably has a cylindrical shaped wall 760. The wall 760 preferably has a plurality of feed openings 760 therethrough (preferably for receiving feed attachments 820). An integrated cone 770 and tray 780 are provided. The insert 750 can have two rods 790 and 800 at the top 751 of the insert and a rod 810 at the bottom 752 of the insert 750. Rod 790 has a horizontal linear portion in the middle, vertical ends, and two angled portions that separate the horizontal portion form the vertical portions. Rod 800 has a horizontal linear portion in the middle, vertical ends, and two angled portions that separate the horizontal portion form the vertical portions. The horizontal portions of the rods 790 and 800 are preferably perpendicular to each other.

It is appreciated that the insert can have only one rod 790, as seen in FIGS. 48-51.

The top rod (or rods) and bottom rod can be grasped by the user for carrying (top rod) and twisting (bottom rod).

The process of inserting the insert 750 into the body 620 is illustrated in FIGS. 48-51.

Figure 48:
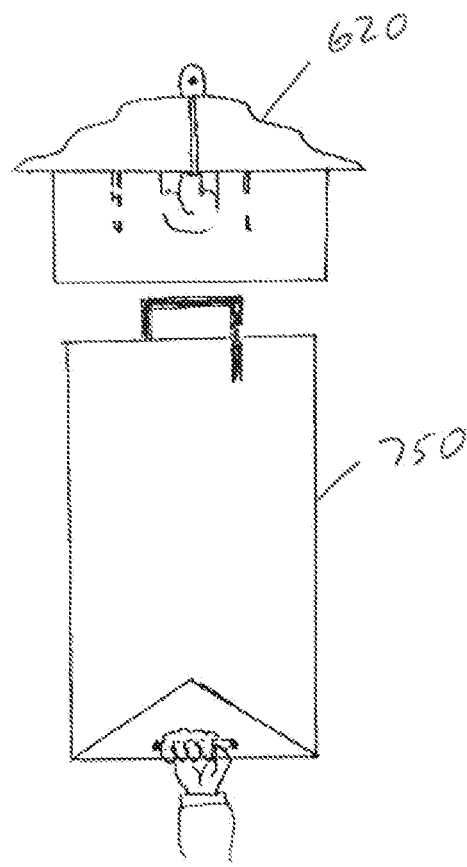
FIG. 48 is a side view showing the insert below the body.
Figure 49:
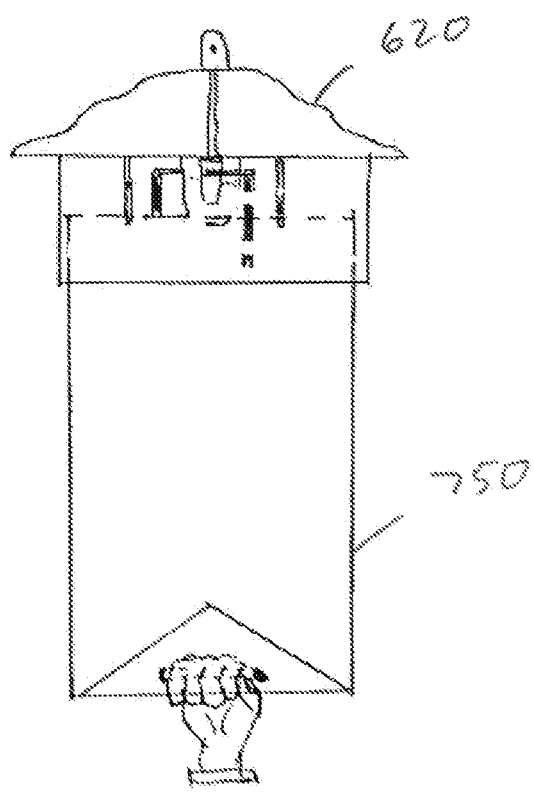
FIG. 49 is similar to FIG. 48, but shows the insert being received within the cage and being centered by the receiver.
Figure 50:
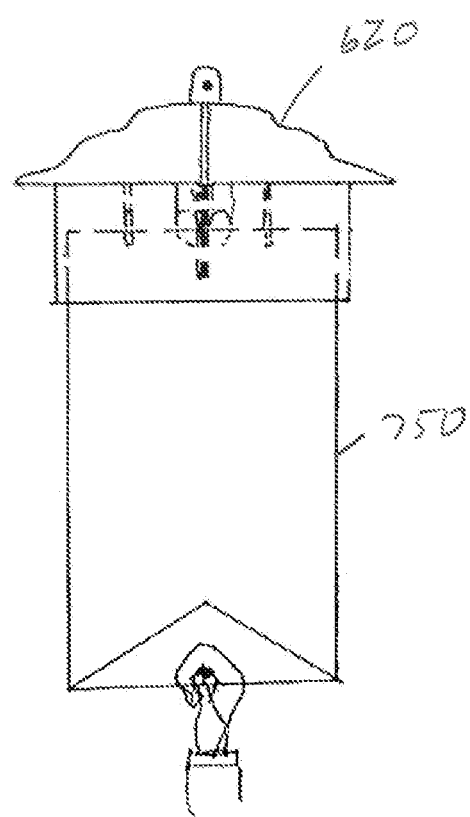
FIG. 50 is similar to FIG. 49, but shows the insert positioned at the top of the cage above the channels.
Figure 51:
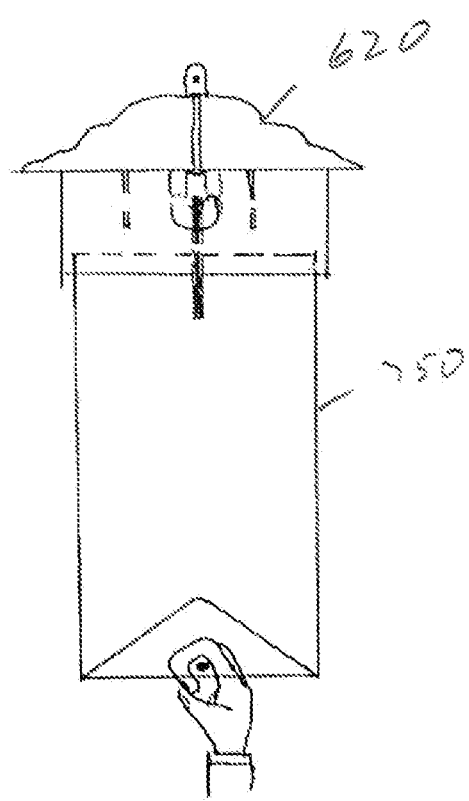
FIG. 51 is similar to FIG. 50, but shows the insert lowered into the channels.

Looking now at FIG. 48, it is seen that a user grabs the lower rod 810 with their hand and aligns the insert 750 with the bottom 637 of the collar 631 (which is open). The user then pushes the insert 750 vertically into the lower portion of the collar 631. Turning to FIG. 49, it is seen the insert 750 is centered within the receiver 630. The angled portions of the rod 790 can aid in centering the insert 750 as they act against the collar to center the insert within the inside wall 638. The insert 750 is moved until it is fully received within the body. In this position, it is noteworthy that the top rod 790 is higher than the upper outer edge of channels 676, 681, 686 and 691. The user then, as seen in FIG. 50, can twist the insert 750 relative to the body 620 via the lower rod 810 to cause the upper rod 790 to contact the back wall of two of the hooks (675 and 680, or 685 and 690, i.e. one pair of hooks) after being twisted up to ¼ turn (while the clevis prevents body rotation). The insert 750 then, as seen in FIG. 51, can be lowered into the channels and the user can disengage from the lower rod 810.

The insert can be removed in the opposite manner. Namely, the user can vertically raise the insert 750 with the body 620 until the upper rod 790 is removed from the channels, the user uses the lower rod 810 to twist the insert 750 so that the insert clears the hooks when it is removed from the receiver 730 by lowering it from the receiver.

Figure 52:
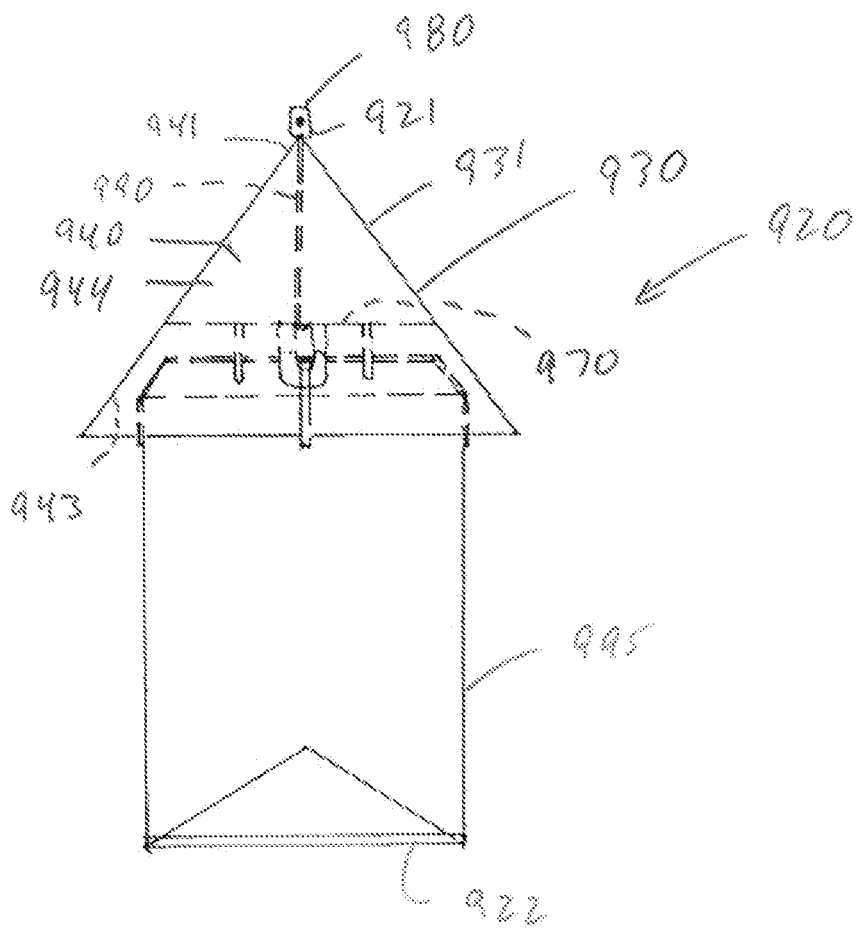
FIG. 52 is a perspective view of an alternative embodiment of the present invention.

Turning now to FIG. 52 it is seen that a further preferred embodiment of the present invention is illustrated. A feeder 910 is provided having a top. The feeder 910 preferably has a body 920 (with a receiver 930 with a roof 931, a plate 970, and a hanger 980), and an insert 995. Each of these components are described in detail below The body 920 has a top 921 and a bottom 922. The body 920 has a receiver 930 that is an elongated and pitched roof 931. The roof 931 has a cone shaped wall 940 with a top 941, a bottom 942, an inside 943 and an outside 944.

The plate 970 is similar to plate 670, and has an outer perimeter. Four hooks are provided, each having a channel, respectively. The hooks are preferably J-shaped hooks. The hooks are arranged into two pairs of oppositely facing hooks. The channels of each pair of hooks are horizontally aligned along an alignment axis. The alignment axis of each pair is preferably perpendicular to each other. A central hole is formed through the plate 970.

The roof 931 and plate 970 are preferably stationarily fixed to each other, wherein the plate 970 cannot rotate relative to the receiver 930.

Hanger 980 is similar or identical to hanger 720. Screw 990 is similar or identical to screw 740.

A screw 990 with a threaded end and a head is provided to join the connected receiver 930 and plate 970 with the roof 931 and hanger 980. The screw passes through holes in the plate and roof, and is received within hanger hole.

An insert 995 is provided, and is preferably similar or identical to insert 750. It is appreciated that the angle of the angled portions of the bar can have the same angle at the pitch of the roof 931. The angled portions of the bar can flushly engage the inside 943 of the roof when the insert is fully received within the receiver and is in position for twisting to engage or twisting to disengage from a pair of the hooks The insertion and removal of the insert 995 into the receiver 930 is similar to how insert 750 is inserted into receiver 630, except that the cone shape of the roof 931 can aid in guiding the insert into being in alignment with a pair of hooks.

Thus, it is apparent that there has been provided, in accordance with the invention, a bird feeding system that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A bird feeding system comprising:
   a body having a receiver and a plate, said plate having a first hook and a second hook; and
   an insert, said insert having a rod, wherein:
   said rod is accessible at a top of said insert, said insert being selectably carried by said rod when said insert is not inserted into said body; and
   said insert is removably received within said body, said insert being removably secured within said body when said rod is secured to said first hook and to said second hook.

2. The bird feeding system of claim 1 wherein said plate is connected to said receiver.

3. The bird feeding system of claim 2 wherein said first hook and said second hook are oppositely facing hooks.

4. The bird feeding system of claim 3 wherein said first hook and said second hook form a first pair of hooks, and said bird feeding system further comprises a second pair of hooks.

5. The bird feeding system of claim 1 wherein said insert further comprises a bottom rod.

6. The bird feeding system of claim 1 wherein said receiver is a collar.

7. The bird feeding system of claim 6 wherein said rod has a middle horizontal portion, a first angled portion and a second angled portion, said first angled portion and said second angled portion being separated by said horizontal portion.

8. The bird feeding system of claim 6 wherein said body further comprises a clevis, said clevis allowing said receiver to rotate about a horizontal axis but not twist relative to the clevis about a vertical axis.

9. The bird feeding system of claim 1 wherein said receiver is a cage having a plurality of risers and at least one ring.

10. The bird feeding system of claim 9 wherein each of said plurality of risers has an indent thereon.

11. The bird feeding system of claim 10 wherein said indent on each of said risers is vertically aligned on each of said risers.

12. The bird feeding system of claim 1 wherein said receiver is an elongated roof.

13. The bird feeding system of claim 12 wherein said elongated roof is cone shaped.

14. A bird feeding system comprising:
   a body having:
      a receiver;
      a plate fixed to said receiver, said plate having a pair of oppositely facing hooks; and
      a roof; and
   an insert, said insert having a bar with a horizontal portion, a first angled portion and a second angled portion, said insert being guided into alignment with said body by interaction of said first angled portion and said second angled portion of said bar, and said receiver,
   wherein said horizontal portion of said bar is removably supported by said pair of oppositely facing hooks.

15. The bird feeding system of claim 14 further comprising a second pair of oppositely facing hooks.

16. The bird feeding system of claim 14 wherein said receiver is a collar.

17. The bird feeding system of claim 14 wherein said receiver is a cone-shaped roof.

18. A method of filling a feeder, said method comprising steps:
   providing a feeder with a body and an insert, the body having a receiver and a plate, the plate having a pair of oppositely facing hooks with respective channels, and the insert having a cylindrical wall and a top rod;
   filling the insert;
   inserting the insert into the receiver;
   twisting the insert to align the top rod with the pair of oppositely facing hooks; and
   lowering the top rod into the respective channels.

19. The method of claim 18 wherein the step of providing the feeder further comprises the step of providing two pairs of oppositely facing hooks.

20. The method of claim 18 wherein the step of providing the feeder further comprises the steps of:
   providing the receiver that is a collar; and
   providing the top rod having a middle horizontal portion, a first angled portion and a second angled portion, said first angled portion and said second angled portion being separated by said horizontal portion.

* * * * *